(12) United States Patent
Chen et al.

(10) Patent No.: US 12,484,968 B2
(45) Date of Patent: Dec. 2, 2025

(54) DENTAL IMPLANTATION SYSTEM AND NAVIGATION METHOD

(71) Applicant: BRAIN NAVI BIOTECHNOLOGY CO., LTD, Hsinchu County (TW)

(72) Inventors: Chieh Hsiao Chen, Santa Clara, CA (US); Kuan Ju Wang, Santa Clara, CA (US); Chih-Yu An, Taoyuan (TW); Shih-Wei Huang, Zhubei (TW); Wen-Ling Chen, Zhubei (TW)

(73) Assignee: Brain Navi Biotechnology Co., Ltd., Zhubei (TW)

( * ) Notice: Subject to any disclaimer, the term of this patent is extended or adjusted under 35 U.S.C. 154(b) by 1159 days.

(21) Appl. No.: 17/273,903

(22) PCT Filed: Sep. 9, 2019

(86) PCT No.: PCT/CN2019/104979
§ 371 (c)(1),
(2) Date: Mar. 5, 2021

(87) PCT Pub. No.: WO2020/048545
PCT Pub. Date: Mar. 12, 2020

(65) Prior Publication Data
US 2021/0346099 A1 Nov. 11, 2021

Related U.S. Application Data

(60) Provisional application No. 62/728,861, filed on Sep. 9, 2018.

(51) Int. Cl.
A61B 34/20 (2016.01)
A61B 34/10 (2016.01)
(Continued)

(52) U.S. Cl.
CPC .............. *A61B 34/20* (2016.02); *A61B 34/10* (2016.02); *A61B 34/30* (2016.02); *A61B 90/37* (2016.02);
(Continued)

(58) Field of Classification Search
CPC ....... A61C 1/082; A61C 8/0089; A61C 1/084; A61B 34/20; A61B 34/10; A61B 34/30;
(Continued)

(56) References Cited

U.S. PATENT DOCUMENTS 5,251,127 A * 10/1993 Raab ..................... A61B 90/10
606/130
5,343,391 A * 8/1994 Mushabac .............. A61C 9/008
433/79
(Continued)

FOREIGN PATENT DOCUMENTS

CN 2075392 U 4/1991
CN 201256993 Y 6/2009
(Continued)

OTHER PUBLICATIONS

Japanese Office Action in Japanese Application No. 2021-512886, Date of drafting Apr. 19, 2022.
(Continued)

Primary Examiner — Heidi M Eide
Assistant Examiner — Lina Faraj
(74) Attorney, Agent, or Firm — Haverstock & Owens, A Law Corporation

(57) ABSTRACT

A dental implantation system and navigation method are provided. The dental implantation system includes: a multi-axis robotic arm having an action end connected to a dental implantation device; and at least one optical device coupled to the multi-axis robotic arm to capture a real-time image information about an implant-receiving region of an
(Continued)

implant-receiving patient during a dental implantation process. The multi-axis robotic arm drives the dental implantation device moving along a predetermined path in the implant-receiving region according to association result of a pre-implantation plan and the real-time image information. The pre-implantation plan is associated with a 3D model of the implant-receiving region and includes a predetermined entry point associated with the predetermined path, at least one predetermined relay point associated with the predetermined path, and a predetermined target point associated with the predetermined path. The 3D model is constructed from a pre-implantation image information about the implant-receiving region.

28 Claims, 19 Drawing Sheets

(51) Int. Cl.
*A61B 34/30* (2016.01)
*A61B 90/00* (2016.01)
*A61C 1/08* (2006.01)
*B25J 9/06* (2006.01)
*B25J 9/16* (2006.01)

(52) U.S. Cl.
CPC .............. *A61C 1/082* (2013.01); *B25J 9/06* (2013.01); *B25J 9/1664* (2013.01); *A61B 2034/102* (2016.02); *A61B 2034/107* (2016.02); *A61B 2034/2055* (2016.02); *A61B 2090/374* (2016.02); *A61B 2090/3762* (2016.02); *A61B 2562/0271* (2013.01)

(58) Field of Classification Search
CPC .............. A61B 90/37; A61B 2034/102; A61B 2034/107; A61B 2090/374; A61B 2090/3762; A61B 2562/0271; B25J 9/06
See application file for complete search history.

(56) References Cited

U.S. PATENT DOCUMENTS

| | | | | | |
|---|---|---|---|---|---|
| 6,640,128 | B2 * | 10/2003 | Vilsmeier | ............... | A61B 34/20 433/215 |
| 8,709,016 | B2 * | 4/2014 | Park | ....................... | A61B 90/13 606/91 |
| 2002/0028422 | A1 * | 3/2002 | Kumar | ................. | A61C 8/0089 433/165 |
| 2004/0024311 | A1 * | 2/2004 | Quaid, III | ............... | A61B 90/39 600/428 |
| 2005/0186533 | A1 * | 8/2005 | Cohen | .................... | A61G 15/14 433/108 |
| 2006/0142657 | A1 * | 6/2006 | Quaid | .................... | A61B 90/37 600/424 |
| 2011/0316994 | A1 * | 12/2011 | Lemchen | ............... | A61C 9/008 348/66 |
| 2013/0316298 | A1 | 11/2013 | Ikegami et al. | | |
| 2014/0039681 | A1 * | 2/2014 | Bowling | ................ | A61B 34/30 700/261 |
| 2014/0093838 | A1 | 4/2014 | Carmichael et al. | | |
| 2014/0200621 | A1 * | 7/2014 | Malackowski | ........ | A61B 34/70 606/86 R |
| 2014/0275987 | A1 * | 9/2014 | Bzostek | ................. | A61B 34/20 600/424 |
| 2015/0057675 | A1 | 2/2015 | Akeel et al. | | |
| 2017/0000572 | A1 | 1/2017 | Moctezuma de la Barrera et al. | | |
| 2018/0078332 | A1 * | 3/2018 | Mozes | ..................... | A61C 3/02 |
| 2021/0192759 | A1 * | 6/2021 | Lang | ..................... | A61B 90/98 |

FOREIGN PATENT DOCUMENTS

| | | | | |
|---|---|---|---|---|
| CN | 104354041 | A | 2/2015 | |
| CN | 107582193 | A | 1/2018 | |
| CN | 107595418 | A | 1/2018 | |
| IT | 20100053 | A2 | 1/2012 | |
| JP | 2013236748 | A | 11/2013 | |
| WO | WO-9726833 | A1 * | 7/1997 | ............. A61B 17/16 |
| WO | 9803119 | A1 | 1/1998 | |
| WO | WO-2010104198 | A1 * | 9/2010 | ........... A61C 1/0046 |
| WO | 2017064138 | A1 | 4/2017 | |
| WO | 2017147596 | A1 | 8/2017 | |

OTHER PUBLICATIONS

English Translation of Japanese Office Action in Japanese Application No. 2021-512886, Date of drafting Apr. 19, 2022.
Japanese Decision to Grant in Japanese Application No. 2021-512886, drafting date; Sep. 13, 2022.
The International Search Report, PCT/ISA/210 in International Application No. PCT/CN2019/104979, dated 2019-09-09.
The English Translation of the Written Opinion of the International Search Report, in International Application No. PCT/CN2019/104979, dated 2019-09-09.
The Written Opinion of the International Search Report, in International Application No. PCT/CN2019/104979, dated Sep. 9, 2019.
First Office Action, in Chinese Application No. 201980058639.6, dated Dec. 3, 2021, 9 pages.
Second Office Action, in Chinese Application No. 201980058639.6, dated Oct. 10, 2022, 10 pages.
Third Office Action, in Chinese Application No. 201980058639.6, dated Mar. 29, 2023, 8 pages.
European Search Report, dated Mar. 8, 2022, in European Application No. 19858335.3, Applicant: Brain Navi Biotechnology Co., Ltd., 14 pages.
Indian Examination Report, in Indian Application No. 202127009855, mailed on Feb. 8, 2021, 6 pages.
Indian Hearing Notice, in Indian Application No. 202127009855, mailed on Nov. 23, 2023.
Taiwan Office Action, in Taiwanese Application No. 10921125500, dated Nov. 23, 2020, 19 pages.
Taiwanese Grant Notification in Taiwanese Application No. 10921125500 dated May 17, 2021.
The International Search Report of the International Searching Authority dated Dec. 11, 2019 from PCT Patent Application No. PCT/CN2019/104979.

* cited by examiner

300

310 — Read a file of pre-implantation image information

320 — Draw a dental arch line

330 — Create a pano (panorama) and a 3D model

340 — Create an alveolar 3D model or detect a sinus region

350 — Select an implant 3D model

360 — Adjust the implant position

370 — Implant plan alert function

380 — Output a predetermined entry point on the dental implantation path and a predetermined target point on the dental implantation path

710 → Gingival flap surgery or gingival perforation

720 → Drilling process

730 → Implant securing process

- 1010 — Connect a dental implantor to the dental implantation system
- 1020 — Predetermine the torque value of the dental implantor
- 1030 — Provide a mounted drill for securing the implant in place
- 1040 — Drive the robotic arm moving to a predetermined position
- 1050 — Fix the implant to the drill
- 1060 — Secure the implant in place and detect the torque value
- 1070 — Does the current torque value exceed a predetermined torque value of the dental implantor and has the dental implantor been secured in place?
  - No → back to 1060
  - Yes ↓
- 1080 — Implant securing is complete

1710 — Register an initially detected special mark position and compute the transformation matrix 1720 — Project the currently detected special mark position back to the image 1730 — Is the projection distance greater than the threshold? — No (returns to 1710)

Yes ↓

1740 — Determine that the implant-receiving region has moved

1750 — Update the dental implantation path position

FIG.17

DENTAL IMPLANTATION SYSTEM AND NAVIGATION METHOD

BACKGROUND OF THE INVENTION

Field of the Invention

The present disclosure relates to dental implantation systems and navigation methods and, more particularly, to a dental implantation system implemented by a robotic arm and a navigation method.

Description of the Prior Art

Conventional dental implantation procedures are performed by dentists by hand, and the quality of holes drilled in an implant-receiving region (such as a jawbone) of an implant-receiving patient depends on dentists' tactual performance and experience. As a result, the conventional dental implantation procedures have a drawback: inexperienced or inattentive dentists perform the conventional dental implantation procedures badly. In view of this, a dental implantation system conducive to dental implantation and its method are required.

SUMMARY OF THE INVENTION

In view of the aforesaid drawback of the prior art, it is an objective of the present disclosure to provide a dental implantation system and a navigation method, so as to not only perform autonomic dental implantation with a robotic arm, but also feed back real-time information about an implant-receiving region of an implant-receiving patient to the dental implantation system and an operator (such as dentist) during a dental implantation process, with a view to timely, appropriately adjusting the entire dental implantation planning or progress during the dental implantation process.

According to a first concept of the present disclosure, a dental implantation system comprises: a multi-axis robotic arm having an action end connected to a dental implantation device; and at least one optical device coupled to the multi-axis robotic arm to capture a real-time image information about an implant-receiving region of an implant-receiving patient during a dental implantation process, wherein the multi-axis robotic arm drives the dental implantation device moving along a predetermined path in the implant-receiving region according to an association result of a pre-implantation plan and the real-time image information, wherein the pre-implantation plan is associated with a 3D model of the implant-receiving region and comprises a predetermined entry point associated with the predetermined path, at least one predetermined relay point associated with the predetermined path, and a predetermined target point associated with the predetermined path, wherein the 3D model is constructed from a pre-implantation image information about the implant-receiving region.

According to the concept, the pre-implantation image information includes at least one of a computed tomography (CT) scan image information, a magnetic resonance imaging (MRI) image information, and an X-ray imaging image information.

According to the concept, the at least one optical device includes a first optical device and a second optical device, the first optical device being coupled to the action end of the multi-axis robotic arm to capture the real-time image information, and the second optical device being coupled to a basal end of the multi-axis robotic arm to capture a mark position information.

According to the concept, the dental implantation system further comprises a marking device rigidly connected to the implant-receiving patient, wherein the second optical device captures the mark position information associated with the marking device.

According to the concept, the predetermined path is determined according to at least one of an alveolar nerve position and a sinus position which are marked in the pre-implantation image information.

According to the concept, the at least one predetermined relay point is determined according to at least one of a bone density in the implant-receiving region and a length of the predetermined path.

According to the concept, the dental implantation device is driven to move along the predetermined path in the implant-receiving region and retreat from the predetermined path upon arrival at the at least one predetermined relay point.

According to the concept, the dental implantation system further comprises a temperature sensor disposed on the dental implantation device, wherein the dental implantation device retreats from the predetermined path in response to a sensing result of the temperature sensor.

According to the concept, when the dental implantation device retreats from the predetermined path, the dental implantation system further adjusts the at least one predetermined relay point in the pre-implantation plan.

According to the concept, the dental implantation system further comprises an implant securing device driven by the multi-axis robotic arm to secure an implant in the implant-receiving region according to the predetermined path, wherein the implant securing device stop operating as soon as a real-time torque value associated with the implant reaches a predetermined torque threshold.

According to the concept, the dental implantation system further comprises a processing device in communicative connection with the multi-axis robotic arm and the at least one optical device to instruct the multi-axis robotic arm to drive the dental implantation device moving along the predetermined path in the implant-receiving region according to the association result of the pre-implantation plan and the real-time image information.

According to the concept, the dental implantation system further comprises a wearable display device in communicative connection with the processing device to display to an operator at least one of the real-time image information, the pre-implantation image information, the predetermined path, the predetermined entry point, the at least one predetermined relay point, the predetermined target point, a bone density in the implant-receiving region, a real-time temperature of the dental implantation device, a movement speed of the dental implantation device, a real-time torque of the implant, and a virtual image associated with the dental implantation process.

According to a second concept of the present disclosure, a dental implantation system comprises: a multi-axis robotic arm; and a dental implantation device connected to an action end of the multi-axis robotic arm, wherein the multi-axis robotic arm drives the dental implantation device undergoing a reciprocating motion along a predetermined path in an implant-receiving region of an implant-receiving patient according to a pre-implantation plan until dental implantation drilling is complete, wherein the pre-implantation plan comprises at least one predetermined relay point associated with the predetermined path and determined according to at least one of a bone density in the implant-receiving region and a length of the predetermined path.

According to the concept, the dental implantation system further comprises: a first optical device coupled to the action end of the multi-axis robotic arm to capture a real-time image information about the implant-receiving region while the dental implantation device is operating; a marking device rigidly connected to the implant-receiving patient; and a second optical device coupled to a basal end of the multi-axis robotic arm to capture a mark position information of the marking device.

According to the concept, the dental implantation system further comprises a processing device in communicative connection with the multi-axis robotic arm, the first optical device and the second optical device to instruct the multi-axis robotic arm to drive the dental implantation device undergoing a reciprocating motion along the predetermined path in the implant-receiving region according to the association result of the pre-implantation plan and the real-time image information.

According to the concept, the dental implantation system further comprises a wearable display device in communicative connection with the dental implantation system to display to the operator at least one of the real-time image information, association information in the pre-implantation plan, the predetermined path, a bone density in the implant-receiving region, a real-time temperature of the dental implantation device, a movement speed of the dental implantation device, and a virtual image associated with a dental implantation drilling process.

According to the concept, the pre-implantation plan is associated with a 3D model of the implant-receiving region, and the 3D model is constructed from a pre-implantation image information about the implant-receiving region.

According to the concept, the pre-implantation image information includes at least one of a computed tomography (CT) scan image information, a magnetic resonance imaging (MRI) image information and an X-ray imaging image information.

According to the concept, the predetermined path is determined according to at least one of an alveolar nerve position and a sinus position which are marked in the pre-implantation image information.

According to the concept, the dental implantation device is driven to move along the predetermined path in the implant-receiving region and retreat from the predetermined path upon arrival at the at least one predetermined relay point.

According to the concept, the dental implantation system further comprises a temperature sensor disposed on the dental implantation device, wherein the dental implantation device retreats from the predetermined path in response to a sensing result of the temperature sensor.

According to the concept, when the dental implantation device retreats from the predetermined path, the dental implantation system further adjusts the at least one predetermined relay point in the pre-implantation plan.

According to the concept, the dental implantation device is a retractable drilling device.

According to a third concept of the present disclosure, a retractable drilling device for dental implantation, comprising: a sleeve having a first terminal portion with a mounting portion whereby the sleeve is mounted on a dental implantation device, wherein a screw hole is formed at a second terminal portion and positioned distal to the mounting portion; and a drill element having an abutting head and a drill body extending from the abutting head, the drill body having an external thread portion, wherein the external thread portion of the drill element is fastened into the screw hole of the sleeve, wherein, the abutting head abuts against an inner wall of the sleeve and is near the first terminal portion when the abutting head is at a first position, and the dental implantation device is driven to drive the sleeve rotating and thereby cause the drill fastened to the sleeve to move from the first position to a second position and thus protrude from the sleeve until the abutting head reaches the second terminal portion to thereby abut against the inner wall of the sleeve.

According to a fourth concept of the present disclosure, a retractable drilling device for dental implantation, comprising: a sleeve having a first terminal portion with a mounting portion whereby the sleeve is mounted on a dental implantation device, wherein a hole is formed at a second terminal portion and positioned distal to the mounting portion; and a drill member disposed in the sleeve and comprising: a cylindrical base having an outer surface corresponding in shape to and thus abutting against an inner wall of the sleeve, wherein a conical recess is formed in the cylindrical base and positioned proximate to the mounting portion; a drill body having an end connected to the cylindrical base and another end protruding from the hole of the sleeve by a first length; a spring fitting around a portion of the drill body, the portion being inside the sleeve, the spring having an end abutting against the cylindrical base and another end abutting against an inner wall of the sleeve and being positioned proximate to the second terminal portion; and at least one ball disposed in the conical recess, wherein the cylindrical base and the drill body are integrally formed, wherein, when the dental implantation device is driven to drive the retractable drilling device rotating, the at least one ball rolls outward across the conical recess from a center of the conical recess and thereby exerts on the conical recess an acting force under which the cylindrical base pushes the drill body such that the drill body further protrudes from the hole of the sleeve by a second length.

According to a fifth concept of the present disclosure, a dental implantation navigation method, for guiding movement of a dental implantation device along a predetermined path in an implant-receiving region in a dental implantation system, the method comprising: obtaining, by the dental implantation system, a pre-implantation image information about the implant-receiving region; constructing, by the dental implantation system, a 3D model of the implant-receiving region from the pre-implantation image information; creating, by the dental implantation system, a pre-implantation plan according to the pre-implantation image information and the 3D model, wherein the pre-implantation plan comprises a predetermined entry point associated with the predetermined path, at least one predetermined relay point associated with the predetermined path, and a predetermined target point associated with the predetermined path; obtaining, by the dental implantation system, a real-time image information about the implant-receiving region; generating, by the dental implantation system, a position transformation information according to at least one initial feature point included in the pre-implantation image information and at least one first feature point included in the real-time image information, so as to align a first position displayed in the real-time image information with a second position displayed in the pre-implantation image information; and driving, by the dental implantation system, the dental implantation device to undergo a reciprocating motion along the predetermined path in the implant-receiving region according to the pre-implantation image information, the real-time image information, the position transformation information, and the pre-implantation plan, wherein the dental implantation system drives the dental implantation device to retreat from the predetermined path when the dental implantation device moves to the at least one predetermined relay point or the predetermined target point according to the pre-implantation plan.

According to the concept, the method further comprises: detecting, by the dental implantation system, a real-time temperature value of the dental implantation device; and driving, by the dental implantation system, the dental implantation device to retreat from the predetermined path in response to detection of the real-time temperature value.

According to the concept, the method further comprises:
obtaining, by the dental implantation system, a mark position information of a marking device, wherein the marking device is rigidly connected to the implant-receiving region;
comparing, by the dental implantation system, the mark position information and a determined movement threshold to determine whether a current position of the implant-receiving region has changed; and
adjusting, by the dental implantation system upon affirmative determination, the current position of the dental implantation device according to the mark position information and the change in the current position of the implant-receiving region.

According to the concept, the method further comprises aligning the position of an action end of the dental implantation device.

According to the concept, the method further comprises determining the at least one predetermined relay point according to a bone density in the implant-receiving region and a length of the predetermined path.

According to the concept, wherein the step of obtaining a pre-implantation image information about the implant-receiving region includes marking at least one of an alveolar nerve position in the implant-receiving region and a sinus position in the pre-implantation image information.

According to the concept, the method further comprises providing, by a wearable display device, to the operator at least one of the real-time image information, association information in the pre-implantation plan, the predetermined path, a bone density in the implant-receiving region, a real-time temperature of the dental implantation device, a movement speed of the dental implantation device, and a virtual image associated with a dental implantation process.

BRIEF DESCRIPTION OF THE DRAWINGS

Persons skilled in the art can gain insight into technical features of the present disclosure by making reference to description of embodiments of the present disclosure and accompanying drawings. However, the description and the accompanying drawings are for reference only and should be considered illustrative, as they are not intended to limit the present disclosure.

FIG. 3 is a flowchart of a creating process of a pre-implantation plan of the dental implantation system according to an exemplary embodiment of the present disclosure.

FIG. 7 is a flowchart of a dental implantation process according to a specific embodiment of the present disclosure.

FIG. 10 is a flowchart of securing an implant in place according to a specific embodiment of the present disclosure.

FIG. 17 is a flowchart of detecting, with a marking device, whether a patient has moved according to a specific embodiment of the present disclosure.

DETAILED DESCRIPTION OF THE EMBODIMENTS

Figure 1:
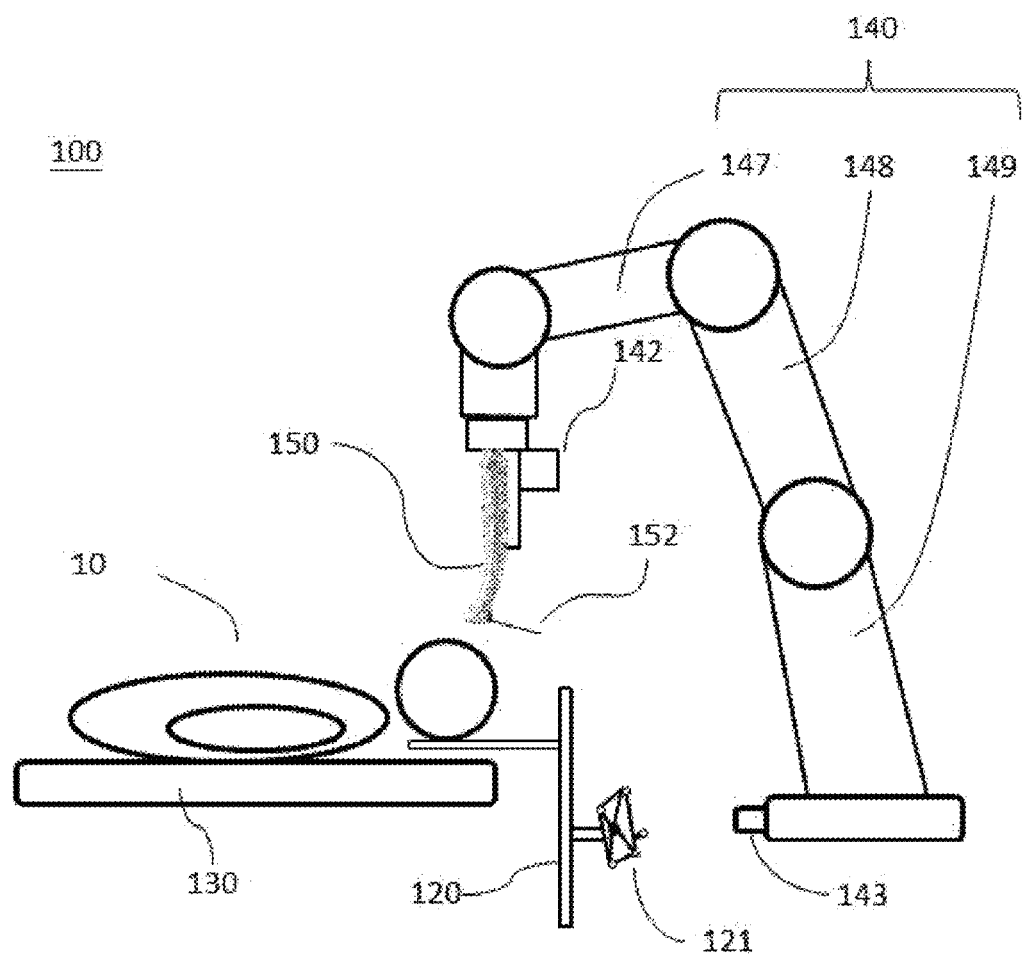
FIG. 1 is a schematic view of the relationship between a dental implantation system and an implant-receiving patient according to an exemplary embodiment of the present disclosure.

Concepts of the present disclosure are hereunder described in accordance with exemplary embodiments with reference made to accompanying drawings. In the accompanying drawings and the description, similar or identical constituent elements are denoted by identical reference numerals. To serve illustrative purposes, the accompanying drawings are, in terms of each layer's thickness and shape, neither drawn to show actual measurements nor drawn to scale. It is possible that constituent elements not shown in the accompanying drawings or not described hereunder are well-known among persons skilled in the art.

Referring to FIG. 1, there is shown a schematic view of the relationship between a dental implantation system and an implant-receiving patient according to an exemplary embodiment of the present disclosure. As shown in FIG. 1, a dental implantation system 100 essentially comprises a multi-axis robotic arm 140, a dental implantation device 150, a first optical device 142 and a second optical device 143. The multi-axis robotic arm 140 comprises support arms 147, 148, 149 connected together. The dental implantation device 150 and the optical device 142 are coupled to an action end of the robotic arm 140. The optical device 143 is coupled to the robotic arm 140 (for example, coupled to a basal end of the robotic arm 140). In the embodiment of the present disclosure, the optical devices 142, 143 comprise a 2D camera or 2D camera module. The camera module comprises a projector. Alternatively, in a variant embodiment, the 2D camera comprises an infrared (IR) camera, color (RGB) camera or grayscale camera.

Figure 12:
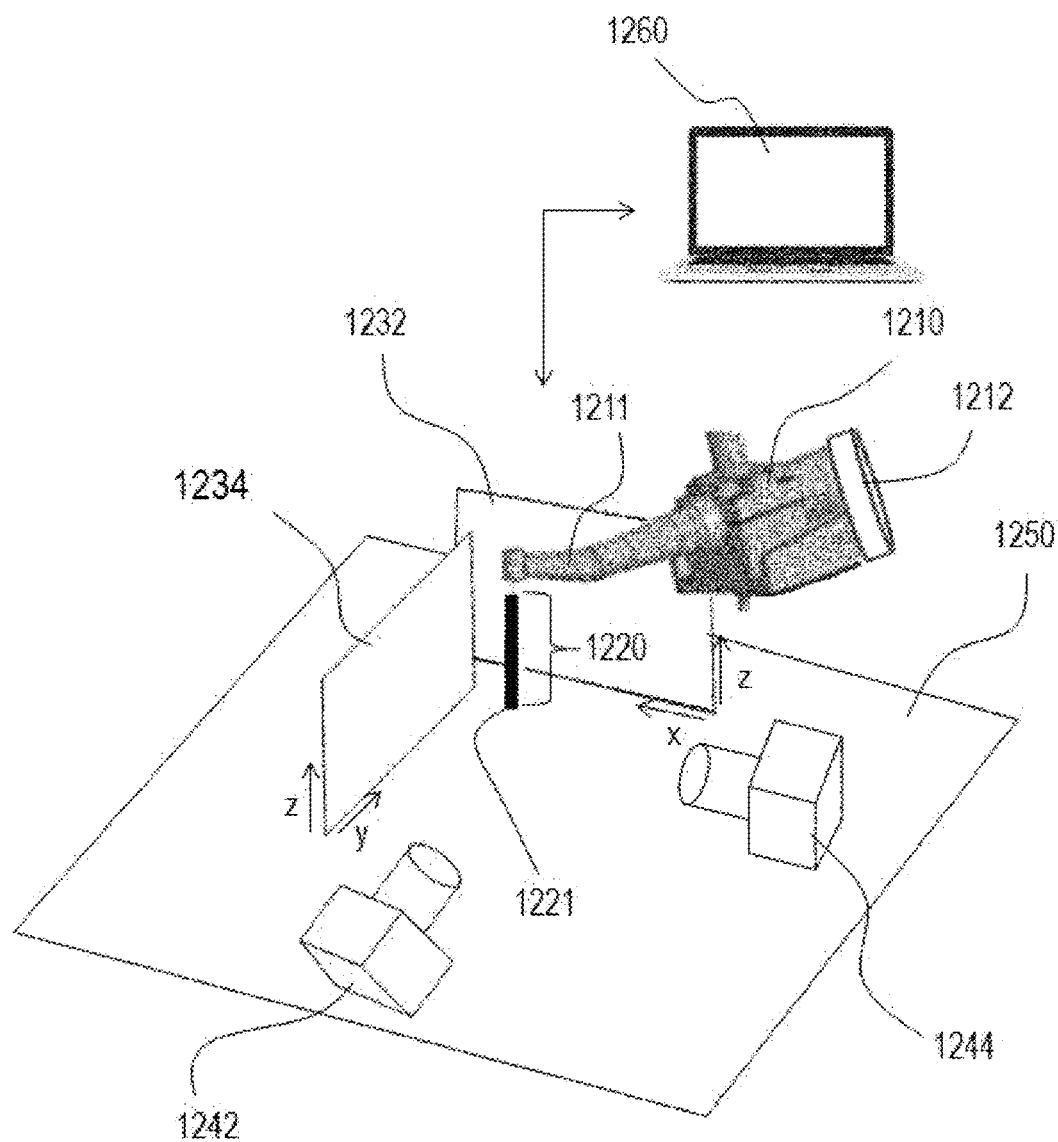
FIG. 12 is a schematic view of aligning the dental implantation system according to a specific embodiment of the present disclosure.
Figure 13:
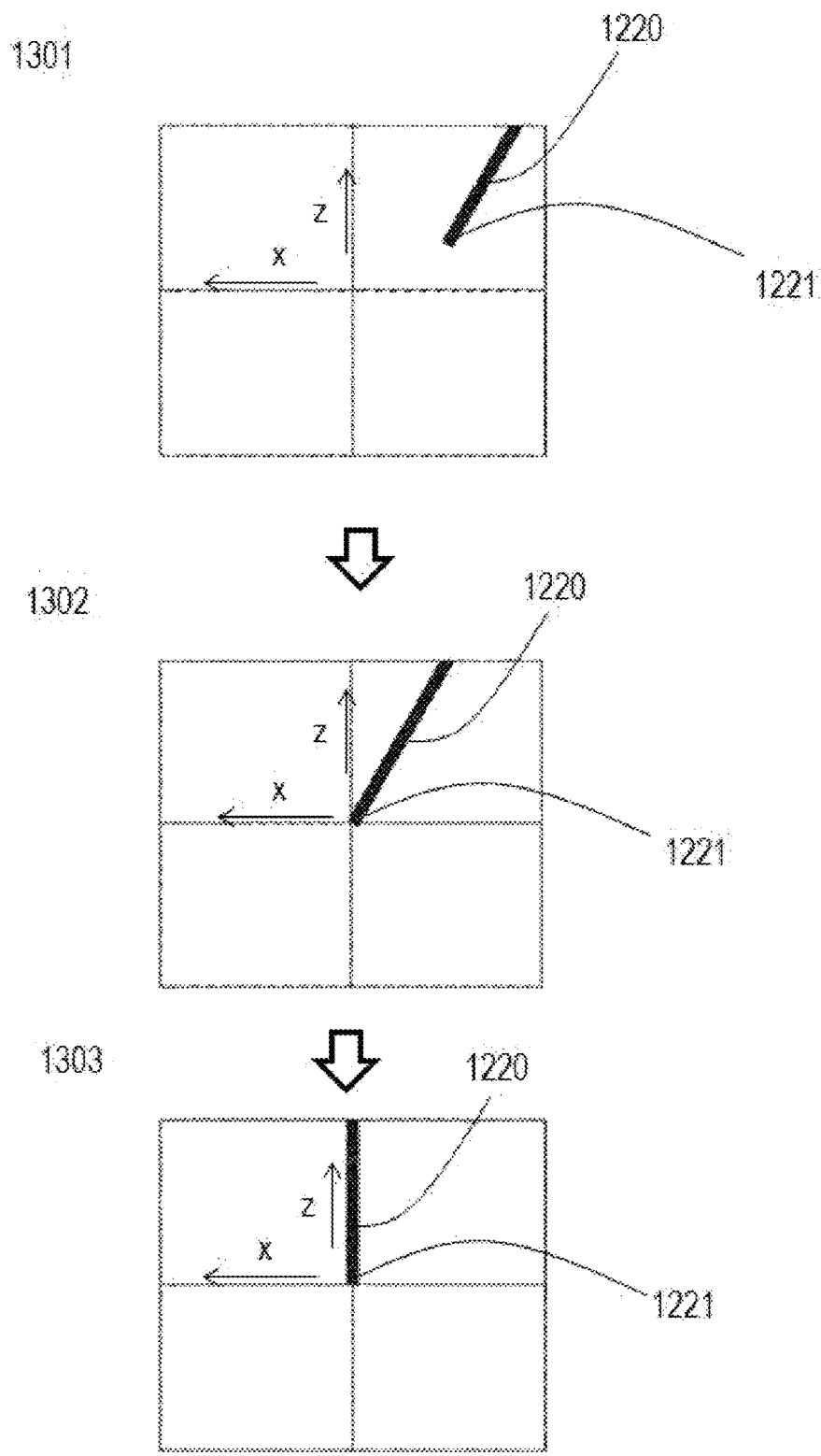
FIG. 13 is a schematic view of identifying an instrument tip position on x-z plane according to a specific embodiment of the present disclosure.
Figure 14:
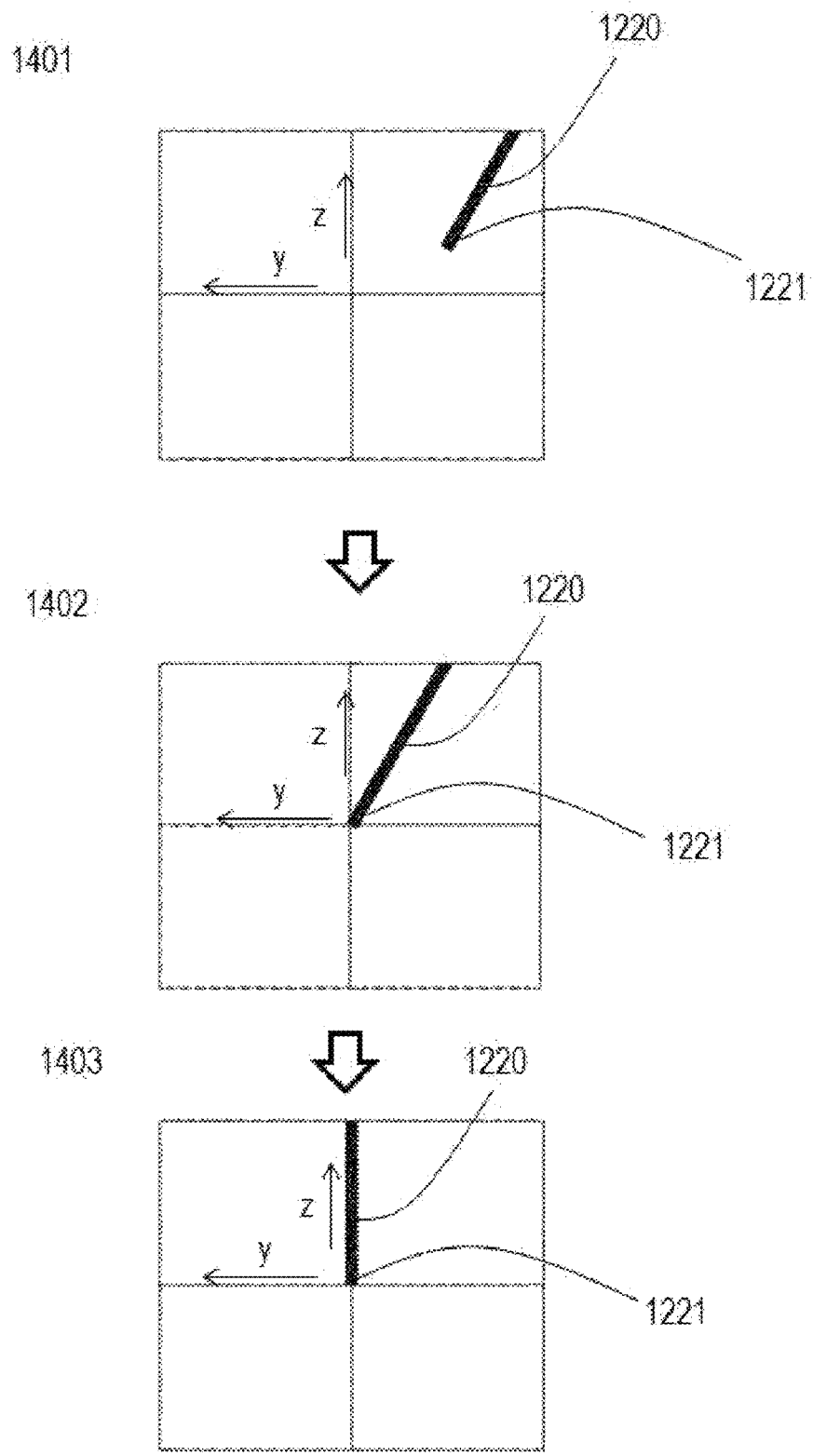
FIG. 14 is a schematic view of identifying an instrument tip position on y-z plane according to a specific embodiment of the present disclosure.

According to the present disclosure, position information transformation relationship between the optical devices 142, 143 and the multi-axis robotic arm 140 is obtained by a predetermined means of alignment. A specific embodiment of position information transformation relationship between an action end (such as tip) 152 of the dental implantation device 150 and the multi-axis robotic arm 140 is further described below (FIG. 12 through FIG. 14).

According to the present disclosure, the dental implantation system 100 further comprises a stand 120 and a marking device 121. The marking device 121 is designed to be a special marking device whose image information is captured by the optical device 143. According to the present disclosure, the dental implantation system 100 is connected to an implant-receiving patient 10 by the marking device 121. For instance, when the head of the implant-receiving patient 10 rests on the stand 120, the stand 120 enables rigid connection between the head of the implant-receiving patient 10 and the marking device 121, and in consequence movement of the implant-receiving patient 10, a cause of a change in the position of an implant-receiving region of the implant-receiving patient 10, can be detected. Preferably, a new position of the marking device 121 is captured by the second optical device 143 to update a dental implantation path. Alternatively, in a variant embodiment, the stand 120 is connected to the head or oral cavity of the implant-receiving patient 10 or to a bed 130 which underpins the implant-receiving patient 10.

Figure 2:
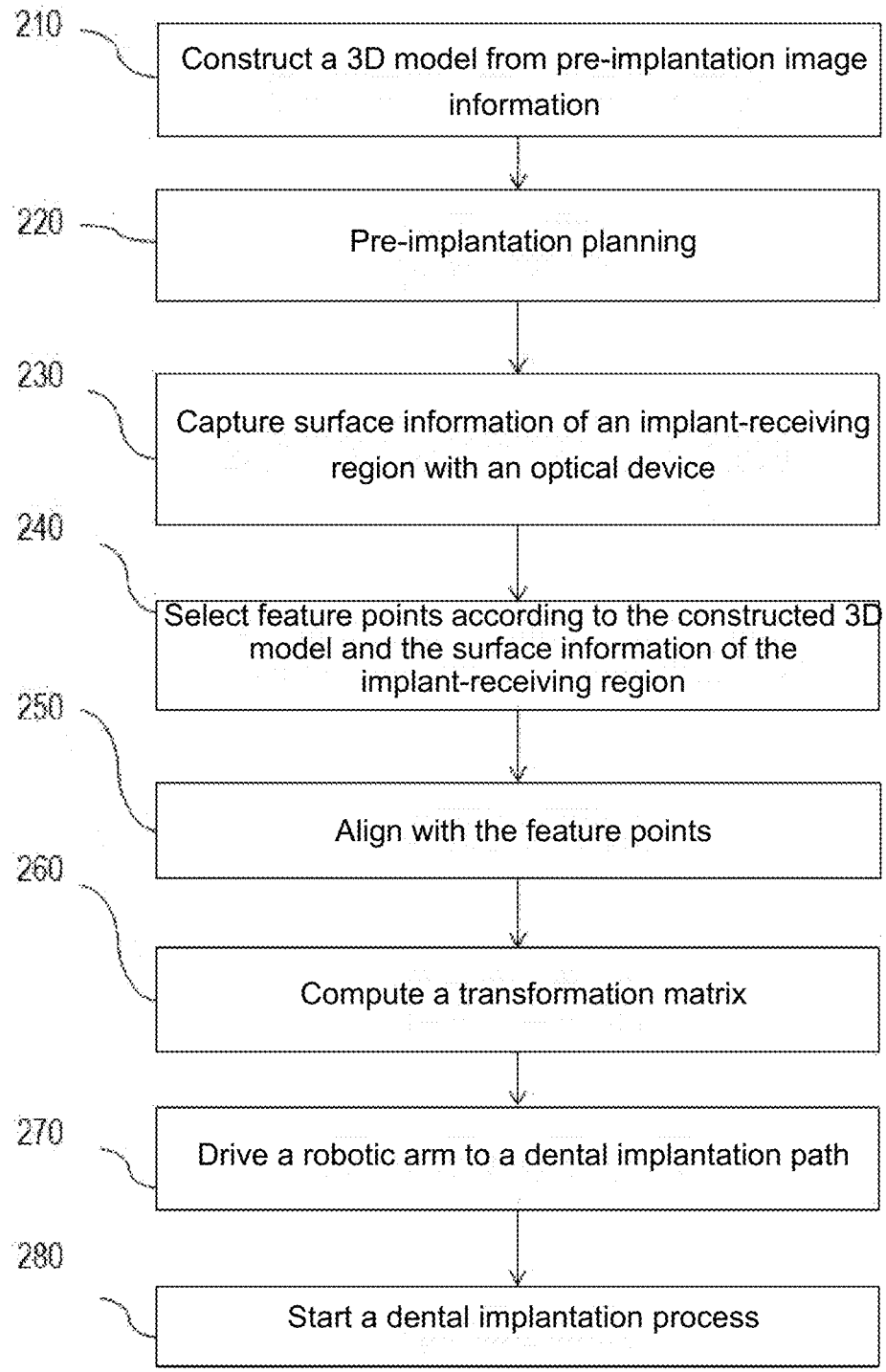
FIG. 2 is a main flowchart of performing dental implantation with the dental implantation system of the present disclosure.

Referring to FIG. 2, there is shown a main flowchart 200 of performing dental implantation with the dental implantation system of the present disclosure. As shown in FIG. 2, performing dental implantation with the dental implantation system of the present disclosure involves entering pre-implantation image information (such as tomography scan image information) about the implant-receiving region and constructing a 3D model from the image information (step 210). In this specific embodiment, the pre-implantation image information includes dental computed tomography (CT) scan information, magnetic resonance imaging (MRI) image information, and/or X-ray imaging image information.

Then, a pre-implantation plan is created according to the pre-implantation image information and the 3D model thus constructed (step 220). According to the present disclosure, the pre-implantation plan includes a predetermined path of a dental implantation device (also known as a dental implantation path), a predetermined entry point associated with the dental implantation path, at least one predetermined relay point and a predetermined target point (i.e., the position attained upon completion of dental implantation). The predetermined relay point is a position point at which the dental implantation device must retreat from the path and stop operating in order to perform dental implantation drilling. The predetermined relay point is determined according to the bone density in the implant-receiving region and the path length of the dental implantation path. In an exemplary embodiment, the dental implantation device retreats from the path and thereby returns to the predetermined entry point. However, in a variant embodiment, the dental implantation device retreats to any appropriate position on the dental implantation path. According to the present disclosure, the pre-implantation image information includes tooth section information of the implant-receiving patient 10 and dental arch line information of the implant-receiving patient 10. The pre-implantation plan further depends on sinus position information of the implant-receiving patient 10, alveolar nerve position information of the implant-receiving patient 10, jaw bone density information of the implant-receiving patient 10, and implant data (inclusive of brand name, shape and size), as further described below (see FIG. 3, FIG. 4A, and FIG. 4B).

Then, 3D partial surface information, such as tooth surface information, of the implant-receiving patient 10 is captured with the optical device 142, so as to obtain real-time image data of the implant-receiving region (step 230). After that, a coordinate transformation process of image data begins.

One or more feature points in the 3D model constructed in step 210 are selected, and one or more feature points in the real-time image data (such as tooth surface information) obtained in step 230 are selected accordingly (i.e., according to the sequence of selecting the feature points in the 3D model constructed in step 210), so as to prepare for coordinate transformation between two sets of data (to be described later and illustrated by FIG. 5) (step 240). In this embodiment, the selected feature points are in the number of three, but the present disclosure is not limited thereto.

Then, a transformation matrix is computed according to the 3D model and the feature points in the tooth surface information (step 250). Coordinates of the pre-implantation image data (obtained by a dental CT scan, for example) are transformed into coordinates of the optical system (real-time image data) with the transformation matrix computed in step 250 (step 260), so as to facilitate transformation of information about the dental implantation path (CT scan coordinates) into optical system coordinates (to be described later and illustrated by FIG. 6).

Next, information about the dental implantation path is substituted into the coordinates system of the robotic arm, so as to drive the robotic arm and the dental implantation device moving along the dental implantation path (step 270) and thereby performing dental implantation (step 280) (to be described later and illustrated by FIG. 7).

Referring to FIG. 3, there is shown a flowchart 300 of a creating process of a pre-implantation plan of the dental implantation system according to an exemplary embodiment of the present disclosure. As shown in FIG. 3, the creating process of the pre-implantation plan comprises the steps described below.

Figure 4A:
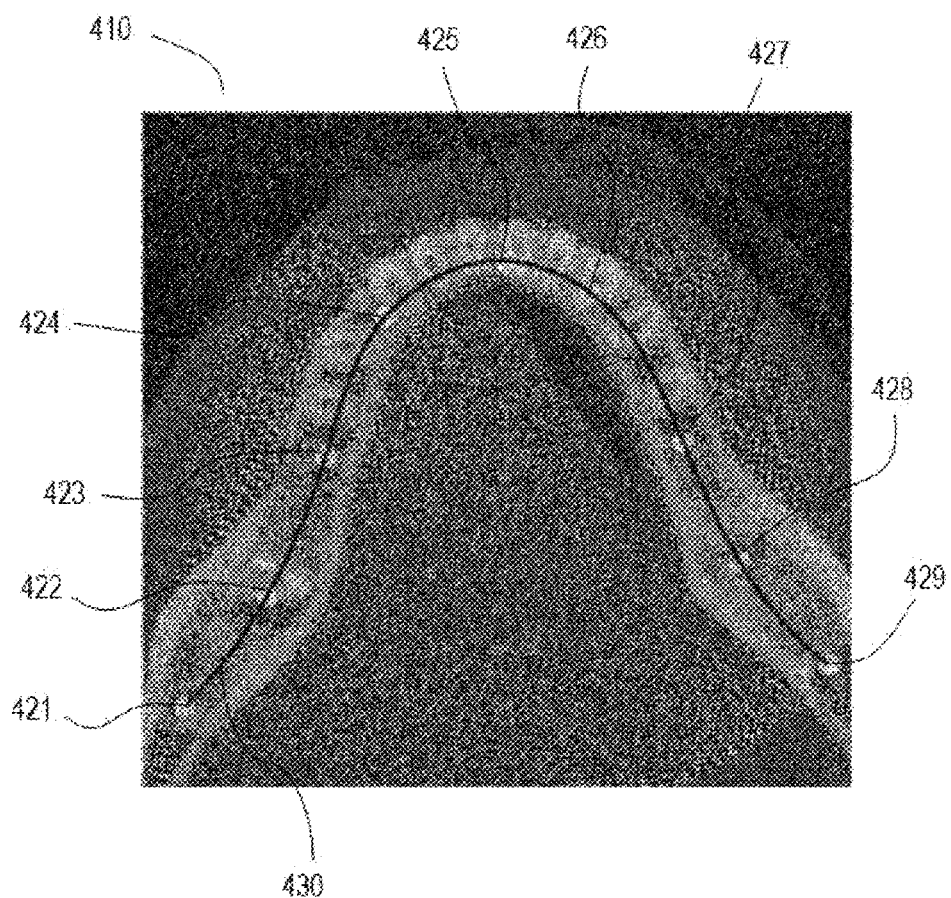
FIG. 4A is a schematic view of drawing a dental arch line during dental implantation planning according to a specific embodiment of the present disclosure.

First, the pre-implantation image data and data about the implant-receiving region, such as cone beam computed tomography (CBCT) scan data about the implant-receiving region, is read (step 310). Next, a dental arch line is drawn according to the image data (step 320). Referring to FIG. 4A, the dental arch line is drawn by following the steps as follows: selecting a plurality of selected points 421~429 on the teeth in a tomography section 410 included in the pre-implantation image data, creating, by the dental implantation system, a dental arch line 430 according to positions between the selected points, and displaying the dental arch line 430 in the tomography section 410. In this embodiment, the selected points are in the number of nine, but the present disclosure is not limited thereto; hence, in the other specific embodiments, the selected points in different quantities are selected as needed.

Figure 4B:
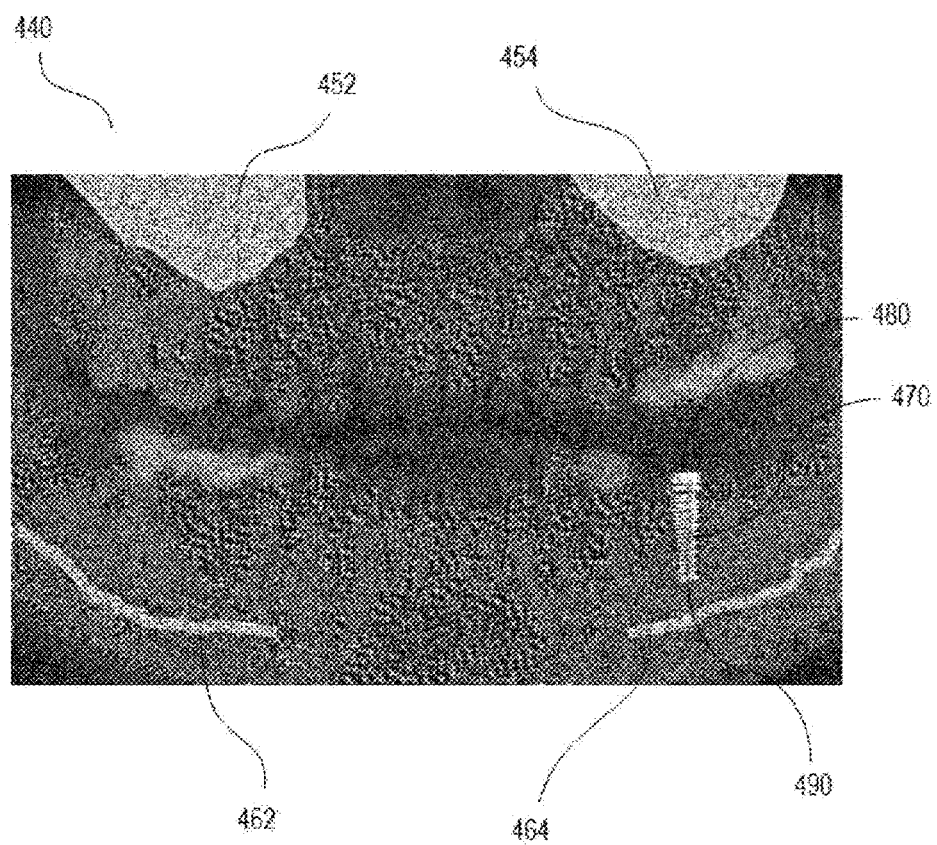
FIG. 4B is a schematic view of a pano created in accordance with the dental arch line according to a specific embodiment of the present disclosure.

Next, a panorama (pano) of the implant-receiving patient 10 and a 3D model thereof are created according to the dental arch line drawn in step 320 (step 330). The pano thus created is shown in FIG. 4B (and denoted by 440). Positions of sinuses 452, 454 and/or alveolar nerves 462, 464 which are marked in the pano shown in FIG. 4B and sinuses (step 340) are detected, and the detected information is displayed in the section information.

After that, an implant 3D model 470 in a database is selected and placed in the section (step 350). Then, the planned position of the implant 3D model 470 is adjusted (step 360) such that the dental implantation path will not be affected by the other tooth position or bone position. According to the present disclosure, if the implant planned position is too closed to the sinuses 452, 454 or the alveolar nerves 462, 464, an alert message will be sent to an operator (step 370). Finally, the dental implantation system outputs the dental implantation path which includes a predetermined entry point 480 and a predetermined target point 490 (step 370).

Figure 5:
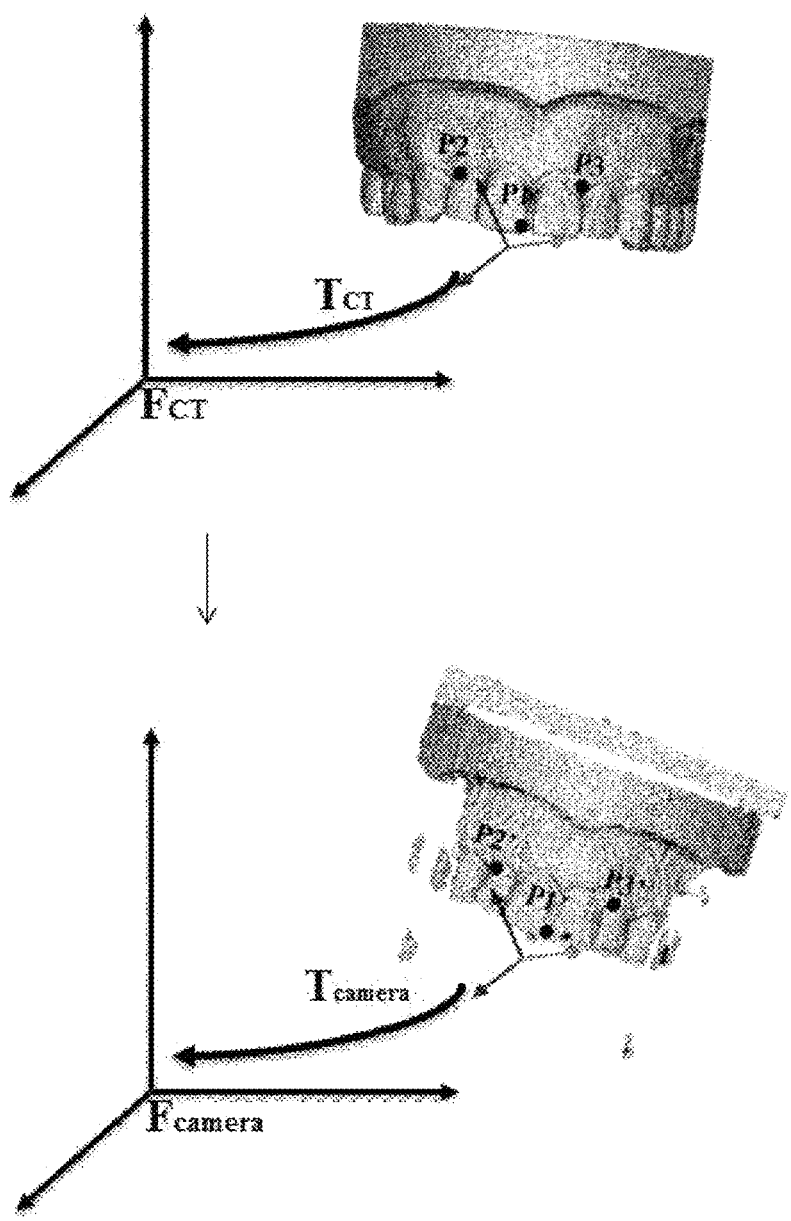
FIG. 5 is a schematic view of transforming CT coordinates into optical coordinates according to a specific embodiment of the present disclosure.
Figure 6:
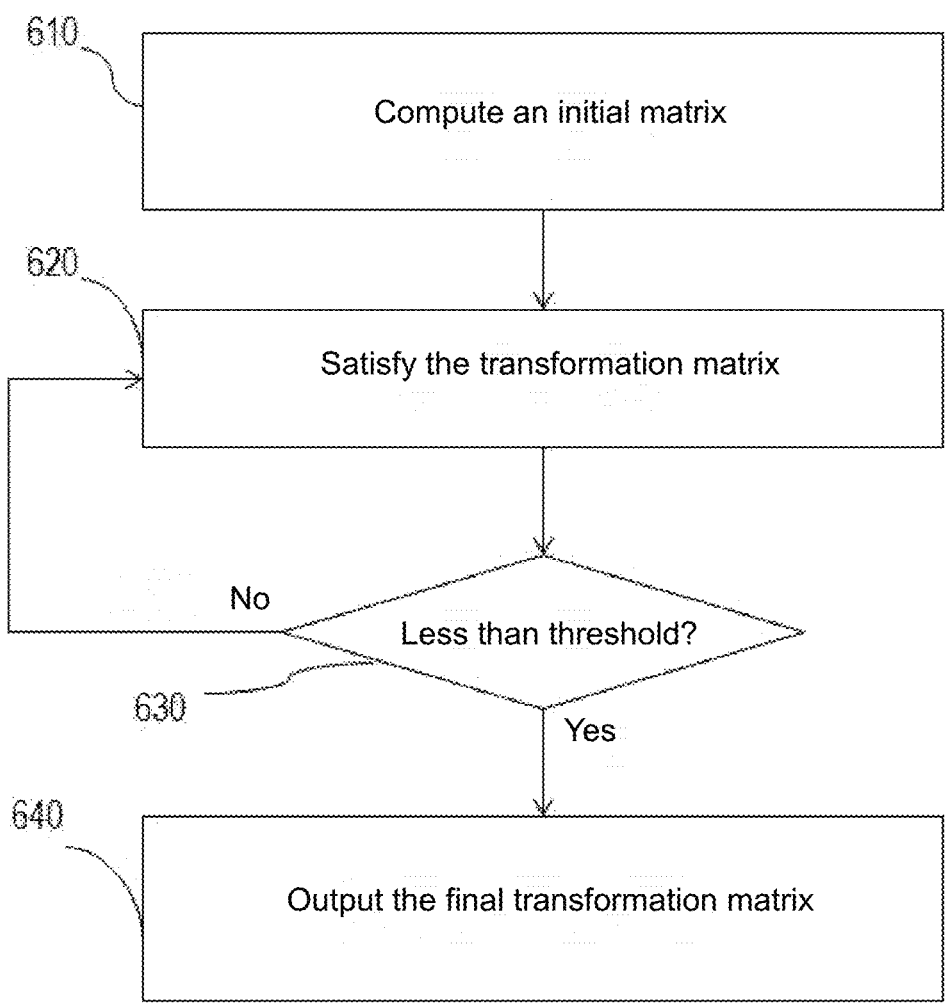
FIG. 6 is a flowchart of computing transformation information according to a specific embodiment of the present disclosure.

Regarding transformation of a coordinates system, FIG. 5 and FIG. 6 show how to transform the CT coordinates system into the optical coordinates system and how to compute the coordinate transformation matrix, respectively. In this embodiment, transformation computation schematically described by a flowchart 600 shown in FIG. 6 is performed according to feature points P1, P2, P3, P1', P2', P3' selected in FIG. 5. However, FIG. 5 and FIG. 6 merely serve exemplary purposes; hence, in a variant embodiment, computation of the transformation matrix is performed according to feature points in quantity subject to changes as needed.

Referring to FIG. 6, an initial diagonal positive transformation matrix is computed (step 610). In this embodiment, a first initial matrix $T_{CT}$ and a second initial matrix $T_{camera}$ are computed. The computation of the first initial matrix $T_{CT}$ and the second initial matrix $T_{camera}$ is satisfied with the equation below. First, computation in CT is as follows:

$$T_{CT} = \begin{vmatrix} Vector_{X_x} & Vector_{Y_x} & Vector_{Z_x} & P_{1x} \\ Vector_{X_y} & Vector_{Y_y} & Vector_{Z_y} & P_{1y} \\ Vector_{X_z} & Vector_{Y_z} & Vector_{Z_z} & P_{1z} \\ 0 & 0 & 0 & 1 \end{vmatrix} \text{ wherein} \quad (1)$$

$$\overrightarrow{P_1P_2}_{norm} \times \overrightarrow{P_1P_3}_{norm} = Vector_Y$$

$$\overrightarrow{P_1P_2}_{norm} \times Vector_Y = Vector_Z$$

$$\overrightarrow{P_1P_2}_{norm} = Vector_X$$

wherein vector $Vector_{X_x}$ is x-component of vector $Vector_X$, vector $Vector_{X_y}$ is y-component of vector $Vector_X$, vector $Vector_{X_z}$ is z-component of vector $Vector_X$, vector $Vector_{Y_x}$ is x-component of vector $Vector_Y$, vector $Vector_{X_y}$ is y-component of vector $Vector_Y$, vector $Vector_{Y_z}$ is z-component of vector $Vector_Y$, vector $Vector_{Z_x}$ is x-component of vector $Vector_Z$, vector $Vector_{Z_y}$ is y-component of vector $Vector_Z$, and vector $Vector_{Z_z}$ is z-component of vector $Vector_Z$. $P1_x$ is x value of point P1, $P1_y$ is y value of point P1, and $P1_z$ is z value of point P1.

Computation in the optical device is as follows:

$$T_{camera} = \begin{vmatrix} Vector_{X'_x} & Vector_{Y'_x} & Vector_{Z'_x} & P_{1'_x} \\ Vector_{X'_y} & Vector_{Y'_y} & Vector_{Z'_y} & P_{1'_y} \\ Vector_{X'_z} & Vector_{Y'_z} & Vector_{Z'_z} & P_{1'_z} \\ 0 & 0 & 0 & 1 \end{vmatrix} \quad (2)$$

wherein $$\overrightarrow{P_{1'}P_{2'}}_{norm} \times \overrightarrow{P_{1'}P_{3'}}_{norm} = Vector_{Y'}$$

$$\overrightarrow{P_{1'}P_{2'}}_{norm} \times Vector_{Y'} = Vector_{Z'}$$

$$\overrightarrow{P_{1'}P_{2'}}_{norm} = Vector_{X'}$$

wherein vector $Vector_{X'_x}$ is x-component of vector $Vector_{X'}$, vector $Vector_{X'_y}$ is y-component of vector $Vector_{X'}$, vector $Vector_{X'_z}$ is z-component of vector $Vector_{X'}$, vector $Vector_{Y'_x}$ is x-component of vector $Vector_{Y'}$, vector $Vector_{X'_y}$ is y-component of vector $Vector_{Y'}$, vector $Vector_{Y'_z}$ is z-component of vector $Vector_{Y'}$, vector $Vector_{Z'_x}$ is x-component of vector $Vector_{Z'}$, vector $Vector_{Z'_y}$ is y-component of vector $Vector_{Z'}$, and vector $Vector_{Z'_z}$ is z-component of vector $Vector_{Z'}$. $P1'_x$ is x value of point P1', $P1'_y$ is y value of point P1', and $P1'_z$ is z value of point P1'.

Next, feature points P1, P2, P3 in CT coordinates information are substituted into the optical system coordinates according to transformation matrix $T_{camera}T_{CT}^{-1}$ to become $P1_{transformed}$, $P2_{transformed}$ and $P3_{transformed}$, respectively (step 620).

After that, step 630 involves confirming whether distances between the computed $P1_{transformed}$, $P2_{transformed}$, $P3_{transformed}$ and P1', P2', P3' satisfy a threshold, respectively. If the distances do not satisfy the threshold, the process flow will go back to step 620 to update $T_{camera}$ matrix and $T_{camera} T_{CT}^{-1}$ matrix with $P1_{transformed}$, $P2_{transformed}$, $P3_{transformed}$ and then generate $P1_{transformed}'$, $P2_{transformed}'$, $P3_{transformed}'$ again by transformation. Next, the distances between the generated $P1_{transformed}'$, $P2_{transformed}'$, $P3_{transformed}'$ and P1', P2', P3' are computed repeatedly until the distances satisfy the threshold. Therefore, the final transformation matrix is as follows:

$$T_{camera}T_{CT}^{-1}$$

Then, the optical system coordinates are substituted into the robotic arm according to a known transformation relationship $T_{camera2robot}$ of the optical device 142 (FIG. 1) and the robotic arm 140 (FIG. 1) (step 610). Given the transformation matrix $T_{camera}T_{CT}^{-1}$ in step 640, the transformation equation becomes $T_{camera2Robot}T_{camera}T_{CT}^{-1}$. Hence, the CT coordinates can be transformed into the robotic arm coordinates.

Referring to FIG. 7, there is shown a flowchart 700 of a dental implantation process performed by the robotic arm and the dental implantation device according to a specific embodiment of the present disclosure. As shown in FIG. 7, when the dental implantation device reaches the predetermined entry point on the dental implantation path, the dental implantation process of the present disclosure is ready to start.

First, before performing dental implantation, the operator (dentist) cuts the gums by hand (gingival flap surgery) or performs gingival perforation with the robotic arm and a special instrument, so as to pave the way for a subsequent dental implantation process (step 710). Then, step 720 is about operation of the robotic arm and the dental implantation device to perform drilling and dental implantation. Necrosis of tooth tissue, which might happen to the implant-receiving patient 10 because of overly high drilling temperature, must be prevented. To this end, step 720 further involves performing a related process whereby tooth tissue is protected against injury otherwise caused by overly high temperature during a drilling process (to be described later and illustrated by FIG. 8 and FIG. 9).

Upon completion of the drilling process performed according to the dental implantation path, the robotic arm fastens the implant into a drilled hole according to the pre-implantation plan (step 730). In this step the implant is fastened firmly in place according to a predetermined torque value, and related details are described later and illustrated by FIG. 10 and FIG. 11.

Figure 8:
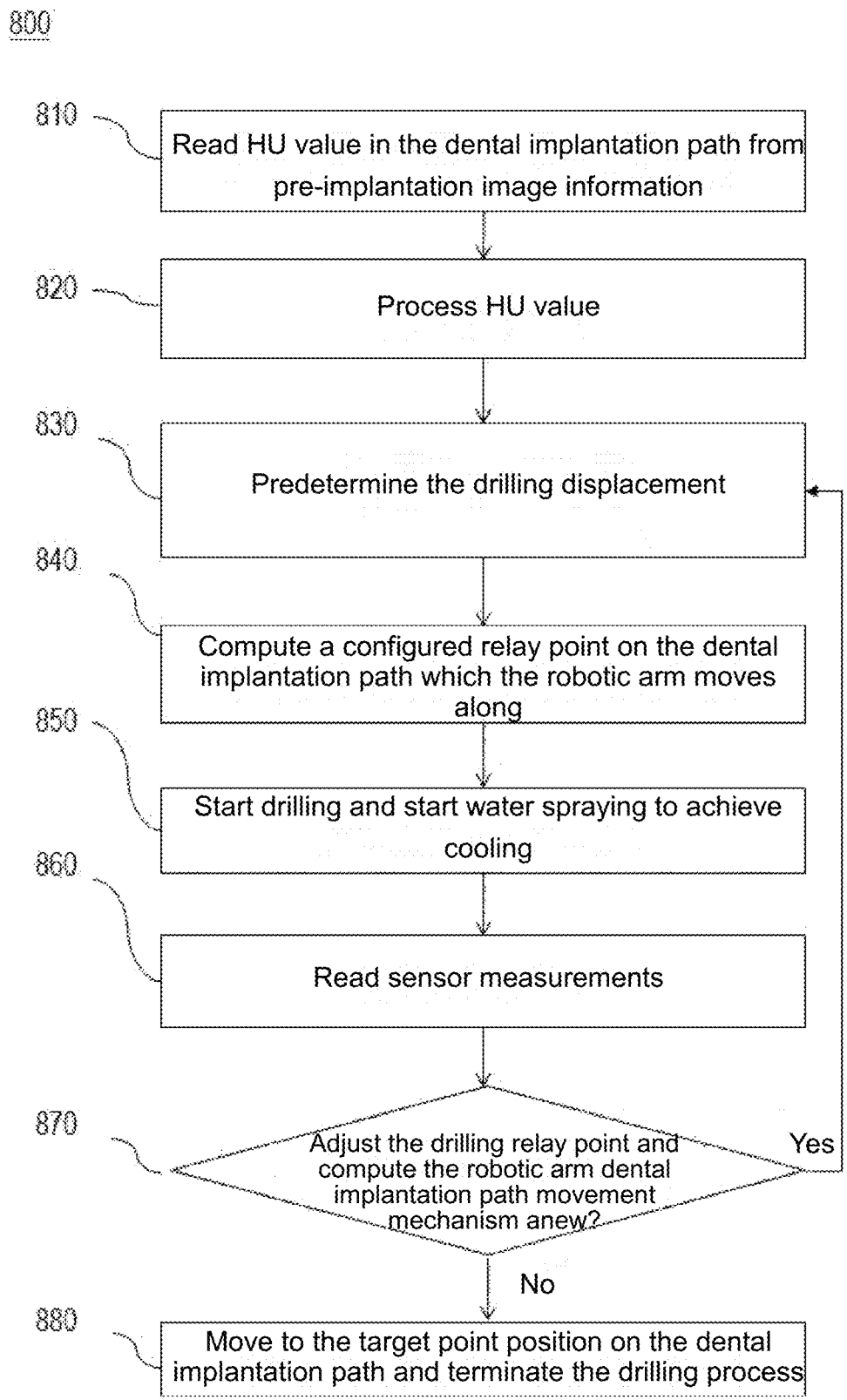
FIG. 8 is a flowchart of a drilling process according to a specific embodiment of the present disclosure.

Referring to FIG. 8, there is shown a flowchart 800 of a drilling process performed by the robotic arm according to a specific embodiment of the present disclosure. As shown in FIG. 8, an objective of the flowchart 800 is to protect tooth tissue against injury otherwise caused by overly high temperature during the drilling process. Therefore, according to the present disclosure, the dental implantation system is equipped with a cooling device (such as a sprinkling device) for lowering the drilling temperature and a sensor for reading related sensing measurements in real time, so as to determine whether to compute the drilling position point anew. The drilling process performed with the dental implantation system of the present disclosure comprises the steps described below.

First, a HU (Hounsfield Unit) value in the dental implantation path is read from the pre-implantation image information or scan information (step 810). After that, the HU value is processed, and the corresponding bone density level of the implant-receiving region is computed (step 820). For instance, in this specific embodiment, there are five bone density levels, namely N1 (the lowest bone density, i.e., the softest bone) to N5 (the highest bone density, i.e., the hardest bone).

Next, displacements of a drilling tool (such as a drill) in each instance of movement thereof are predetermined according to the aforesaid bone density levels (step 830). For instance, in this embodiment, the bone density levels 0~N1 relate to unit displacement of 3.5 mm, the bone density levels N1~N2 to unit displacement of 3.0 mm, the bone density levels N2~N3 to unit displacement of 2.5 mm, the bone density levels N3~N4 to unit displacement of 2.0 mm, and the bone density levels N4~N5 to unit displacement of 1.5 mm. (All the aforesaid unit displacement values are experience design values.)

After that, the number of unit movement position points which the multi-axis robotic arm of the dental implantation system of the present disclosure has on the entire dental implantation path is computed according to the length of the dental implantation path and the unit displacement values obtained in step 830 (step 840). The unit movement position points are the predetermined relay points.

Then, the multi-axis robotic arm and the dental implantation device are driven to drill, and the cooling device is started to spray water for cooling, according to the predetermined relay point positions computed in step 840 (step 850). According to the present disclosure, when the robotic arm moves to the position of each predetermined relay point, the robotic arm drives the dental implantation device to retreat from the dental implantation path, and the dental implantation system starts the cooling device to spray water for cooling, so as to ensure that the drilling temperature will not be high enough to cause necrosis of the jawbone. In an exemplary embodiment, the dental implantation device retreats from the dental implantation path and thus returns to the predetermined entry point. However, in another embodiment, the dental implantation device retreats to any appropriate position on the dental implantation path. In the drilling process, real-time temperature and pressure of the dental implantation device are detected with a temperature sensor or pressure sensor mounted on the robotic arm or the dental implantation device, respectively (step 860), to judge current progress and condition (step 870). When the sensed measurements exceed the threshold, the robotic arm drives the dental implantation device to retreat from the dental implantation path and thereby return to the predetermined entry point position. After that, the process flow goes back to step 830, computing the drilling unit displacement and updating the unit movement position point (i.e., the predetermined relay point) anew before continuing with the drilling process. If the sensor information does not exceed the threshold, the robotic arm will control the dental implantation device to keep moving to the next position point until it reaches the predetermined target point on the dental implantation path, thereby finishing the drilling process.

Figure 9:
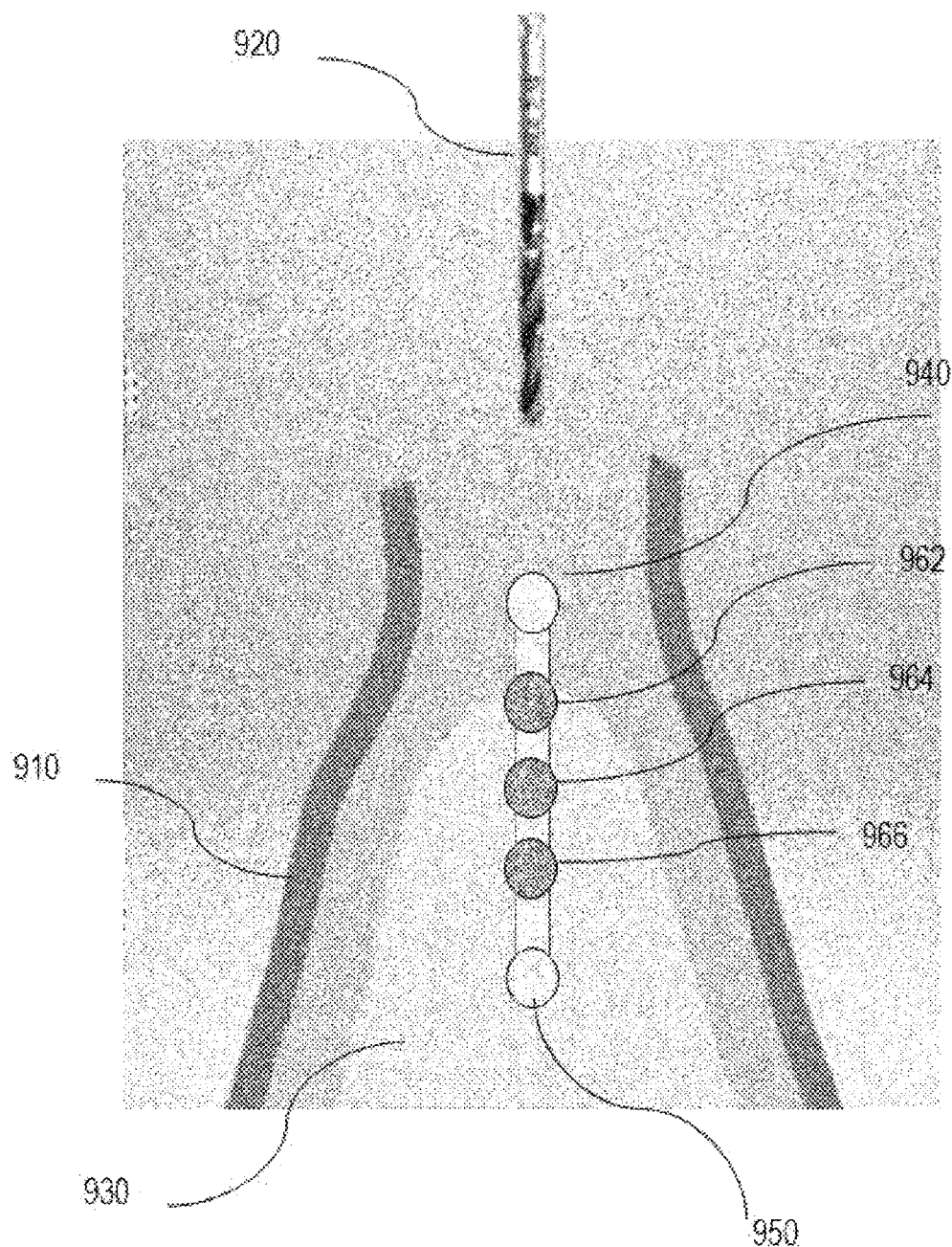
FIG. 9 is a schematic view of a drilling process according to a specific embodiment of the present disclosure.

Referring to FIG. 9, there is shown a schematic view of a drilling process performed by the robotic arm according to a specific embodiment of the present disclosure. As shown in the diagram, by the time when gingival flap surgery performed on the implant-receiving region is complete, gums 910 have been unfolded to therefore expose a jawbone 930 below. The dental implantation path comprises a predetermined entry point 940, at least one (three in the diagram) predetermined relay point (or unit movement position point) 962, 964, 966, and a predetermined target point 950. A drill 920 enters the dental implantation path at the predetermined entry point 940 and moves along the dental implantation path. The drill 920 stops at the predetermined relay points 962, 964, 966 and reverses until it retreats from the dental implantation path. At this point in time, the dental implantation system starts the cooling device so that the cooling device sprays water and achieves cooling with a view to preventing necrosis of the jawbone 930 otherwise caused by overly high temperature. In an exemplary embodiment, the dental implantation device retreats from the dental implantation path and thereby returns to the predetermined entry point. However, in another embodiment, the dental implantation device retreats to any appropriate position on the dental implantation path. According to the present disclosure, the predetermined relay point (or unit movement position point) is determined according to the length of the dental implantation path and the bone density in the implant-receiving region of the jawbone 930. According to the present disclosure, the dental implantation device (i.e., the drill 920) is connected to the action end of the multi-axis robotic arm and moved by the robotic arm.

In a specific embodiment, after the HU value of the dental implantation path has been read, computation of position points related to the drilling process, such as the predetermined entry point, the predetermined relay point and the predetermined target point, begin. Furthermore, during the drilling process, a sprinkling device is used to lower the drilling temperature with a view to protecting tooth tissue in the implant-receiving region against injury. The measurements of the temperature or pressure sensor are read in real time to instantly determine whether to compute drilling-related position points anew. In a variant embodiment, the sensor is mounted on the robotic arm or the dental implantation device to enable the dental implantation system to read its measurements. In an embodiment, before the commencement of the drilling process, the dental implantation system reads the dental implantation path and HU value, identifies the corresponding unit displacement, and computes/determines the predetermined relay point (computes movement frequency) on the dental implantation path.

Referring to FIG. 10, there is shown a flowchart 1000 of securing an implant in place according to a specific embodiment of the present disclosure. As shown in FIG. 10, the implant securing process of the present disclosure comprises the steps described below.

First, a dental implantor (i.e., implant securing device) is connected to the dental implantation system of the present disclosure (step 1010). In this embodiment, the dental implantor is a commercially-available dental implantor which already comes with related data, such as the rotation speed or torque of the implant. The dental implantation system of the present disclosure is connected to the dental implantor to acquire torque information about the implant with a view to exercising feedback control over the robotic arm.

After that, a torque value required for fastening the implant in place is predetermined (step 1020). The torque value depends on the size of the implant and the bone density in the implant-receiving region. In this specific embodiment, a dentist predetermines the torque value according to its experience value and assigns the predetermined torque value to the dental implantation system. A drill for securing the implant in place is mounted on the dental implantation device of the present disclosure (step 1030). The dental implantation system starts driving the robotic arm to the predetermined entry point on the dental implantation path (step 1040). Then, the implant is fixed to the drill (step 1050). Next, step 1060 involves securing the implant in place and detecting the current torque value in real time. After that, step 1070 involves determining, according to a real-time detection result of the torque value, whether the torque value exceeds the torque value predetermined in step 1020 and required for the dental implantor and whether the implant has reached its destination. If the determination is negative, the process flow will go back to step 1060, allowing the dental implantation device to keep alternating between securing the implant in place and loosening the implant. As soon as the torque value detected in real time reaches the torque value predetermined in step 1020 and reaches the predetermined target point on the dental implantation path, the implant securing process of the present disclosure terminates (step 1080).

Figure 11:
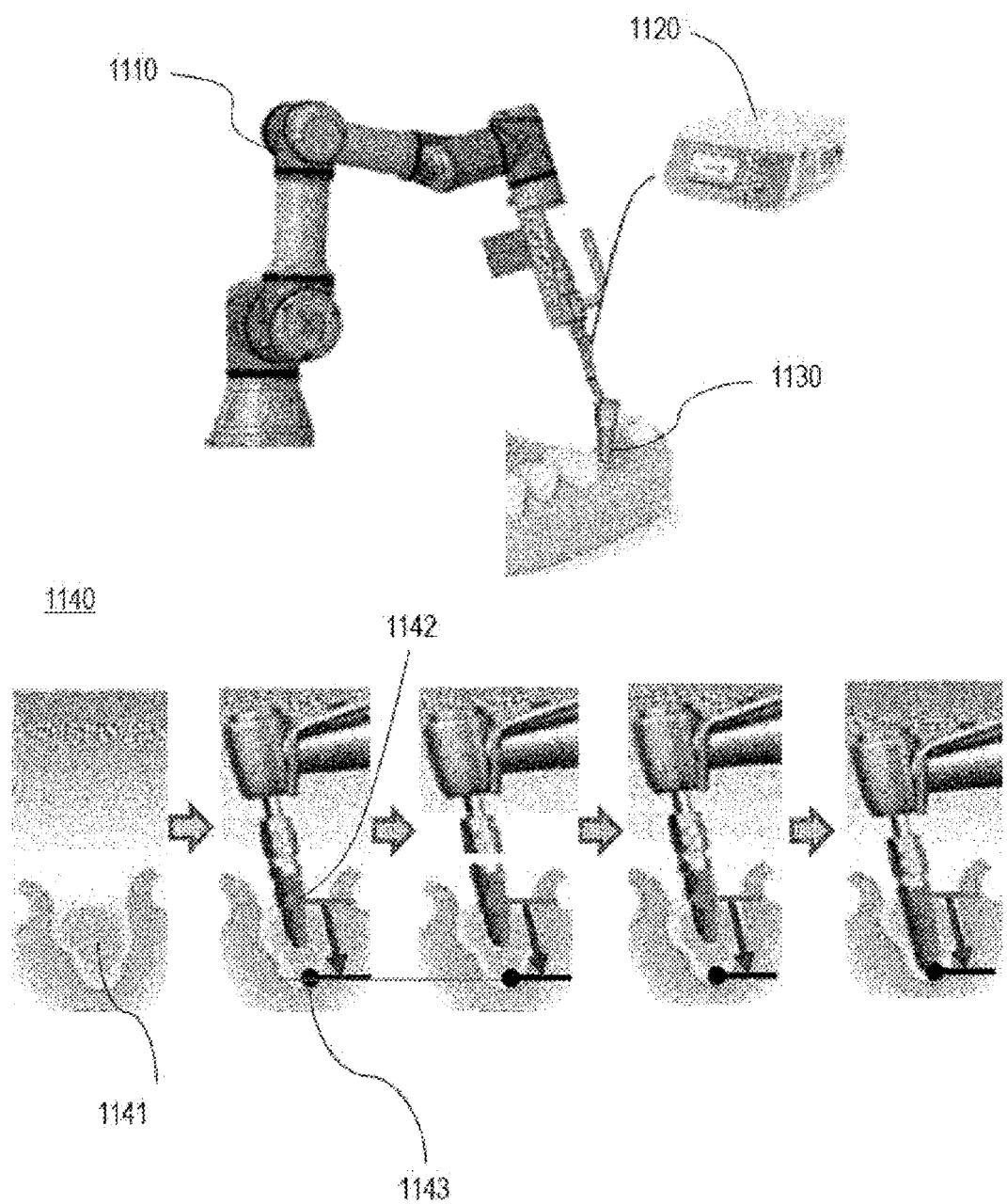
FIG. 11 is a schematic view of securing the implant in place according to a specific embodiment of the present disclosure.

Referring to FIG. 11, there is shown a schematic view of securing the implant in place according to a specific embodiment of the present disclosure. As shown in the diagram, a dental implantor 1120 is connected to a robotic arm 1110 of the dental implantation system of the present disclosure and the dental implantation device at the action end of the robotic arm 1110, whereas an implant 1130 is connected to the dental implantation device. During an implant securing process 1140, the dental implantation device enters a jawbone 1141 in the implant-receiving region from a predetermined entry point 1142 on the dental implantation path, and the dental implantation system performs the step of FIG. 10 along the dental implantation path until the implant 1130 reaches a predetermined target point 1143 on the dental implantation path. According to the present disclosure, the dental implantation device performs drilling and is connected to the action end of the robotic arm 1110 with the predetermined implant torque value of the dental implantor 1120 to detect any change in the current torque value in real time and determine whether the implant has reached its destination. The dental implantation device operates continuously to secure the implant in place until the implant reaches the predetermined implant position.

Referring to FIG. 12, there is shown a schematic view of aligning the dental implantation system according to a specific embodiment of the present disclosure. As shown in FIG. 12, the purpose of the alignment process is to align the position of the action end (tip) of the dental implantation device and transform it into the robotic arm coordinates. In this specific embodiment, the dental implantation device is fixed to the robotic arm flange. The dental implantation system comprises a flange 1212 of the robotic arm, a dental implantation device support member 1210, a dental implantation device 1211, a front-end instrument (such as drill) 1220 of the dental implantation device 1211, an instrument tip 1221, a first light source 1232, a second light source 1234, a first camera 1242, a second camera 1244 and a computation computer 1260. The computation computer 1260 controls the robotic arm wiredly or wirelessly. In some specific embodiments, the first light source 1232 and the second light source 1234 are backlight boards disposed on a plane 1250 perpendicularly. In some specific embodiments, the plane 1250 is aligned by a standard instrument attached to the flange 1212, in accordance with the robotic arm coordinates, and by an alignment method. After the plane 1250 has been aligned, x- and z-coordinates of the first light source 1232 correspond to x- and z-coordinates of the robotic arm, whereas y- and z-coordinates of the second light source 1234 correspond to y- and z-coordinates of the robotic arm.

In some specific embodiments, the first light source 1232 and the second light source 1234 are perpendicular to each other. In some other specific embodiments, the first camera 1242 is disposed on the plane 1250 and perpendicular to the second light source 1234, whereas the second camera 1244 is disposed on the plane 1250 and perpendicular to the first light source 1232. The front-end instrument 1220 is disposed in the first light source 1232 and the second light source 1234 such that the first camera 1242 and the second camera 1244 take pictures of the front-end instrument 1220.

Referring to FIG. 13, there is shown a schematic view of identifying an instrument tip position on x-z plane according to a specific embodiment of the present disclosure. As shown in FIG. 13, the front-end instrument 1220 has its image projected on the first backlight board 1232 such that the first camera 1242 takes pictures of the front-end instrument 1220. In some other specific embodiments, the image of the front-end instrument 1220 is included in images 1301, 1302, 1303. Furthermore, the front-end instrument 1220 and the front-end instrument tip 1221 are identified in the image 1301. Since the projection plane has been aligned with the robotic arm coordinates (x, z), the front-end instrument tip 1221 is moved to the center of the image, as shown in the image 1302. Then, the direction of the front-end instrument 1220 is corrected by the images as indicated by the image 1303. At this point in time, the alignment of the front-end instrument 1220 with the robotic arm x-z coordinates is complete.

Referring to FIG. 14, there is shown a schematic view of identifying an instrument tip position on y-z plane according to a specific embodiment of the present disclosure. As shown in FIG. 14, the front-end instrument 1220 has its image projected on the second backlight board 1234 such that the second camera 1244 takes pictures of the front-end instrument 1220. In some other specific embodiments, the image of the front-end instrument 1220 is included in images 1401, 1402, 1403. Furthermore, the front-end instrument 1220 and the front-end instrument action end (tip) 1221 are identified in the image 1401. Since the projection plane has been aligned with the robotic arm coordinates (y, z), the front-end instrument tip 1221 is moved to the center of the image, as shown in the image 1402. Then, the direction of the front-end instrument 1220 is corrected by the images as indicated by the image 1403. At this point in time, the alignment of the front-end instrument 1220 with the robotic arm y-z coordinates is complete.

According to the present disclosure, the steps of the processes illustrated by FIG. 13 and FIG. 14 keep recurring until the distance to the central point in the x-z projected image and y-z projected image of the front-end instrument tip 1221 is less than the predetermined threshold, thereby finalizing the alignment process.

The present disclosure further provides a retractable drilling device suitable for use in performing drilling and dental implantation in the implant-receiving region which has limited space, such as molars.

Figure 15A:
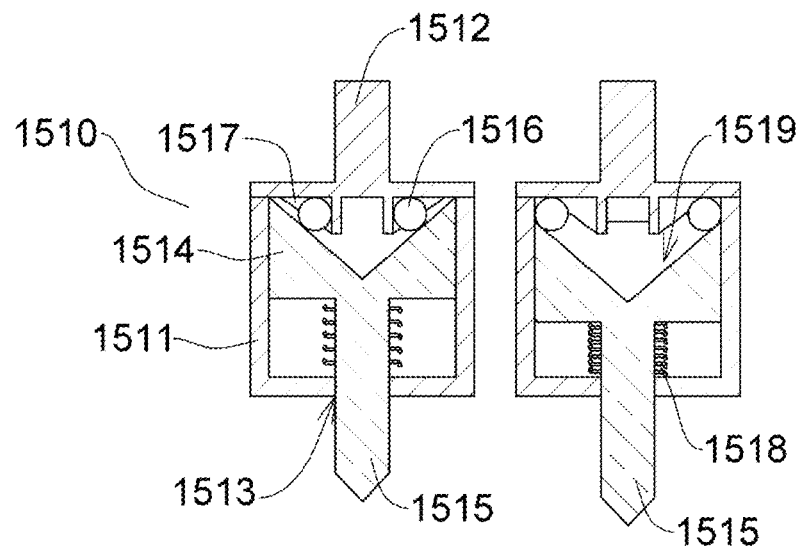
FIG. 15A is a schematic view of a retractable drill for use with the dental implantation device according to a specific embodiment of the present disclosure.
Figure 15B:
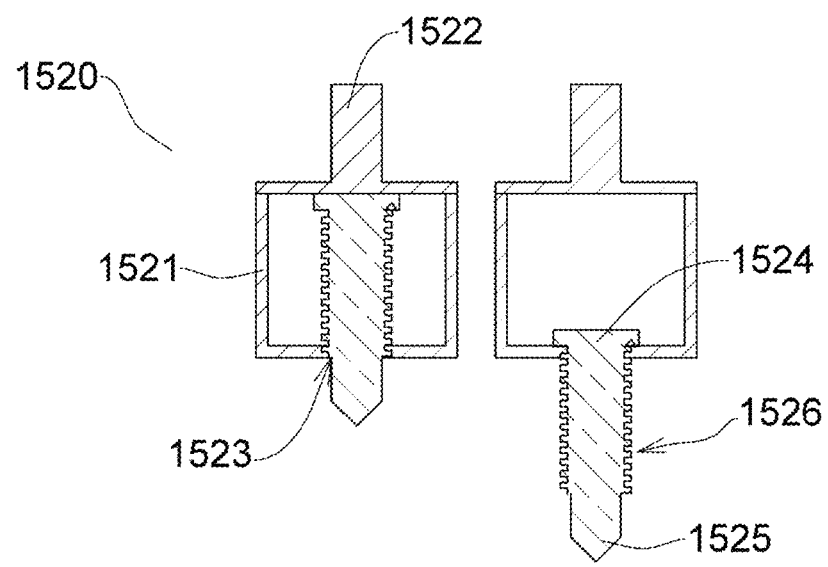
FIG. 15B is a schematic view of the retractable drill for use with the dental implantation device according to another specific embodiment of the present disclosure.

Referring to FIG. 15A and FIG. 15B, there are shown schematic views of a retractable drilling device (drill) for use with the dental implantation device according to two specific embodiments of the present disclosure, respectively. FIG. 15A shows a drill which can extend and retract when driven under a centrifugal force according to an embodiment of the present disclosure. FIG. 15B shows the drill which can extend and retract when driven by means of screw-on push/pull according to another embodiment of the present disclosure.

As shown in FIG. 15A, according to the present disclosure, a retractable drilling device 1510 essentially comprises a sleeve 1511 and a drill member received in the sleeve 1511. A mounting portion 1512 is disposed at a first terminal portion of the sleeve 1511 and adapted to allow the sleeve 1511 to be mounted on a dental implantation device (not shown). A hole 1513 is formed at a second terminal portion of the sleeve 1511 and positioned distal to the mounting portion 1512. The drill member comprises a cylindrical base 1514, a drill body 1515, at least one ball 1516, 1517 and a spring 1518. The outer surface of the cylindrical base 1514 corresponds in shape to and thus abuts against the inner wall of the sleeve 1511. A conical recess 1519 is formed in the cylindrical base 1514 and positioned proximate to the mounting portion 1512 of the sleeve 1511. The drill body 1515 has one end connected to cylindrical base 1514 and the other end protruding from the hole 1513 of the sleeve 1511 by a first length. The spring 1518 fits around a portion of the drill body 1515, as the portion of the drill body 1515 is inside the sleeve 1511. The spring 1518 has one end abutting against the cylindrical base 1514. The other end of the spring 1518 abuts against the inner wall of the sleeve 1511 and is positioned proximate to the second terminal portion (i.e., near the hole 1513). At least one ball (two balls in this embodiment) 1516, 1517 is disposed in the conical recess 1519. At this point in time, the drill is in a retracted state, as shown in the left diagram of FIG. 15A.

When the dental implantation device of the present disclosure is driven to drive the retractable drilling device 1510 rotating, the balls 1516, 1517 roll outward across the concave surface of the conical recess 1519 from the center of the conical recess 1519 and thereby exert on the conical recess 1519 an acting force (centrifugal force) under which the cylindrical base 1514 pushes the drill body 1515 such that the drill body 1515 further protrudes from the hole 1513 of the sleeve 1511 by a second length (greater than the first length). At this point in time, the drill is in a protruding state, as shown in the right diagram of FIG. 15A.

Preferably, the cylindrical base 1514 and the drill body 1515 are integrally formed.

As shown in FIG. 15B, in another embodiment, a retractable drilling device 1520 of the present disclosure essentially comprises a sleeve 1521 and a drill element. The sleeve 1521 has a first terminal portion with a mounting portion 1522 whereby the sleeve 1521 is mounted on a dental implantation device (not shown). A screw hole 1523 is formed at a second terminal portion of the sleeve 1521 and positioned distal to the mounting portion 1522. The drill element has an abutting head 1524 and a drill body 1525 extending from the abutting head 1524. The drill body 1525 has an external thread structure 1526. The external thread structure 1526 of the drill element is fastened into the screw hole 1523 of the sleeve 1521. When the abutting head 1524 is at a first position (as shown in the left diagram of FIG. 15B), the abutting head 1524 abuts against the inner wall of the sleeve 1521 and is near the first terminal portion (i.e., near the mounting portion 1522). At this point in time, the drilling device 1520 is in a retracted state, as shown in the left diagram of FIG. 15B. By contrast, when the dental implantation device is driven to drive the sleeve 1521 rotating, the drill body 1525 fastened to the sleeve 1521 moves from the first position to a second position (as shown in the right diagram of FIG. 15B) and thus protrudes from the sleeve 1521 until the abutting head 1524 reaches the second terminal portion to thereby abut against the inner wall of the sleeve 1521. At this point in time, the drilling device 1520 is in a protruding state, as shown in the right diagram of FIG. 15B. According to the present disclosure, the drilling devices 1510, 1520 are designed to suit the small space available inside the implant-receiving patient's oral cavity during the drilling process and thus reduce the number of times that the dentist has to change a drill because of variations in the drilling space.

Figure 16:
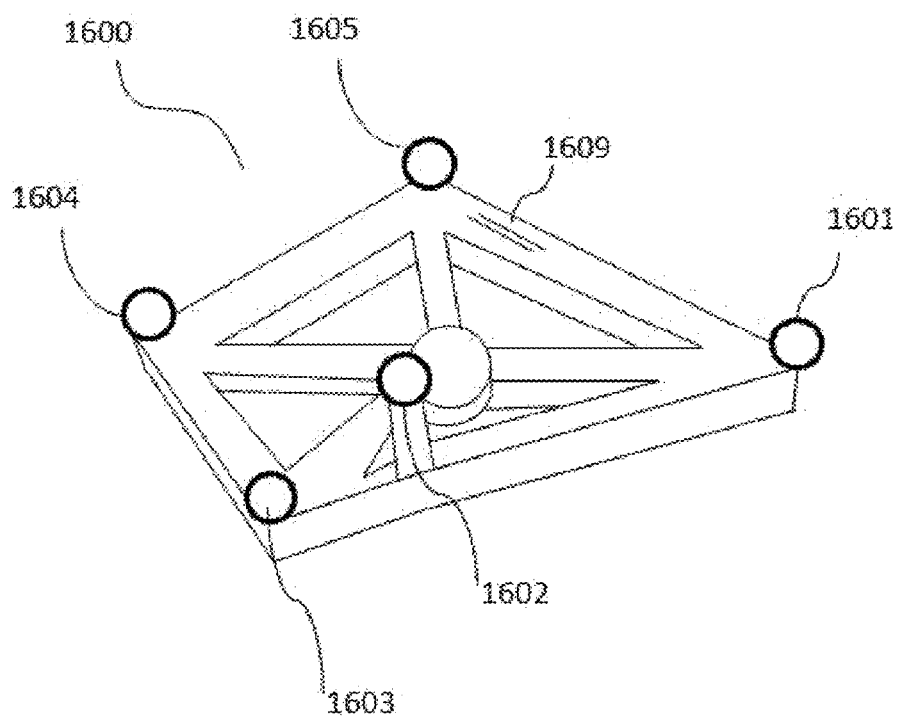
FIG. 16 is a schematic view of a marking device according to a specific embodiment of the present disclosure.

Referring to FIG. 16, there is shown a schematic view of a marking device according to a specific embodiment of the present disclosure. As shown in FIG. 16, a marking device 1600 corresponds to the marking device 121 of FIG. 1. In some specific embodiments, the marking device 1600 comprises feature points 1601, 1602, 1603, 1604, 1605 and a recognition pattern 1609. In an embodiment, the feature points 1601, 1602, 1603, 1604, 1605 and the recognition pattern 1609 of the marking device 1600 emit light of specific wavelengths, and the light is captured by the optical devices (such as the optical device 143) disposed in the dental implantation system of the present disclosure. By contrast, the other parts of the marking device 1600 emit the light too little to be captured by the optical devices. In the other specific embodiments, the feature points 1601, 1602, 1603, 1604, 1605 and the recognition pattern 1609 of the marking device 1600 reflect light (emitted from a light source) of specific wavelengths, and the light is captured by the optical devices (such as the optical device 143) disposed in the dental implantation device of the present disclosure. By contrast, the other parts of the marking device 1600 absorb the light, and thus the optical devices hardly captures the light.

When the dental implantation system finds the positions of the feature points 1601, 1602, 1603, 1604, 1605 and the recognition pattern 1609 of the marking device 1600, it is feasible to identify the 3D positions of the feature points 1601, 1602, 1603, 1604, 1605 and the 3D position of the recognition pattern 1609 and identify the transformation relationship by some 2D-to-3D coordinate transformation methods (such as PNP algorithm). As shown in FIG. 1, the marking device 121 and the implant-receiving patient 10 are rigidly connected (the head of the implant-receiving patient 10 and the marking device 121 are rigidly connected by the stand 120), so as to detect whether the implant-receiving patient 10 (or the implant-receiving region) has moved.

Referring to FIG. 17, there is shown a flowchart 1700 of detecting, with a marking device, whether the implant-receiving patient 10 (or the implant-receiving region) has moved according to a specific embodiment of the present disclosure. According to the present disclosure, the position of the implant-receiving patient 10 (or the implant-receiving region) is continuously detected by the method in steps 270~280 shown in FIG. 2, so as to determine whether to update the path. As shown in FIG. 17, the process flow of the method comprises the steps described below.

First, a mark position initially detected is registered (step 1710), and transformation relationship T is computed. Then, the currently detected positions of the feature points 1601, 1602, 1603, 1604, 1605 and the recognition pattern 1609 in a mark image are projected on the image by transformation relationship T so as to compare the current mark point position and the initial mark point position and calculate the projection distance (step 1720). After that, step 1730 involves determining whether the projection distance exceeds a predetermined threshold. If the determination in step 1730 is negative, the process flow will go back to step 1710 to continue with computation. If the determination in step 1730 is affirmative, it will be determined that the implant-receiving patient 10 or the implant-receiving region has moved (step 1740). At this point in time, the dental implantation system updates transformation relationship T' and updates the dental implantation path information accordingly (step 1750).

Figure 18:
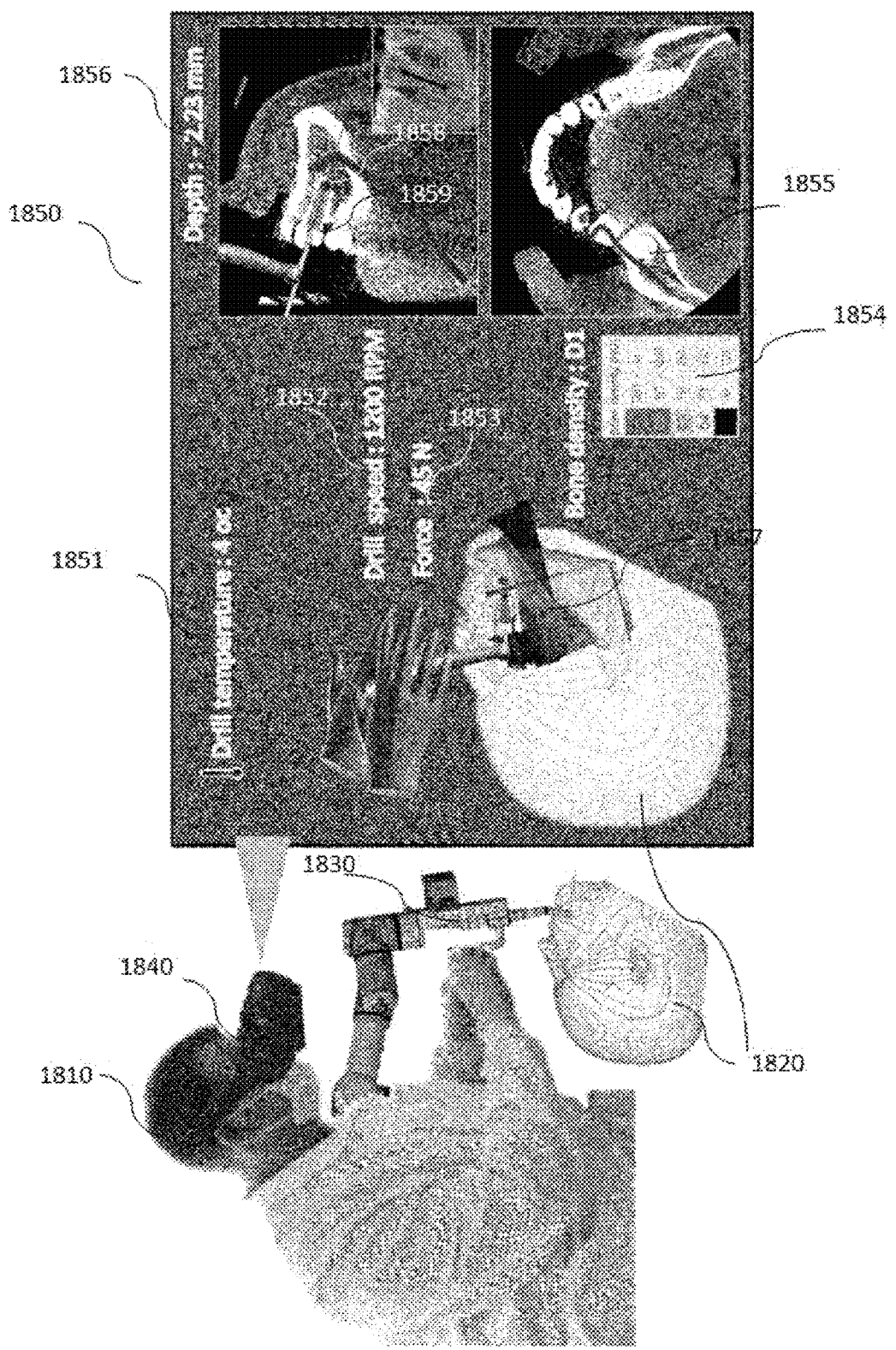
FIG. 18 is a schematic view of visualized surgical contents displayed with the help of a virtual reality device according to a specific embodiment of the present disclosure.

The dental implantation system of the present disclosure is further connected to a wearable display device (such as a wearable virtual reality display device) which displays messages about the dental implantation process to the operator (dentist). Referring to FIG. 18, there is shown a schematic view of visualized surgical contents displayed with the help of a virtual reality device according to a specific embodiment of the present disclosure. As shown in FIG. 18, an operator (dentist) 1810 wears a virtual reality display device 1840 while performing dental implantation on an implant-receiving patient 1820 with a dental implantation device 1830 of the present disclosure. The virtual reality display device 1840 displays contents about the dental implantation process and displays the contents to the operator 1810 by operating in conjunction with a visualized information interface 1850. In this specific embodiment, the visualized information interface 1850 carries information about the pre-implantation plan, including sections obtained by a pre-implantation tomography scan, HU value (display information 1854) of bone density, alveolar nerves (display information 1855), and the dental implantation path which has a predetermined entry point (display information 1859) and a predetermined target point (display information 1858). The visualized information interface 1850 further carries related messages obtained in the dental implantation process, including a drill temperature (display information 1851), a current drill rotation speed (display information 1852), a drill counteracting force value (display information 1853) and a current drill depth (display information 1856). In the visualized information interface 1850, a real-time image information (display information 1857) is superimposed on the images of the implant-receiving patient 1820.

In the other specific embodiments, during the dental implantation process, the real-time information includes information detected with any other sensors, such as torque, alert messages, and alert regions where the drill or the implant comes into contact with alveolar nerves or the sinuses. The visualized information interface 1850 further displays any other pre-implantation information, such as the pano and dental arch line information, but the present disclosure is not limited thereto. In the other specific embodiments, the virtual reality display device 1840 is not limited to head-mounted displays and the like.

The specific embodiments of the devices and/or processes of the present disclosure are illustrated by block diagrams, flowcharts and/or examples. The block diagrams, flowcharts and/or examples depict one or more functions and/or operations. Persons skilled in the art understand that all the functions and/or operations depicted by the block diagrams, flowcharts and/or examples can be implemented individually and/or collectively by hardware, software, firmware or nearly any combination thereof. In some specific embodiments, portions of the subject matter described herein are implemented by application specific integrated circuit (ASIC), field programmable gate array (FPGA), digital signal processor (DSP) or the like. However, persons skilled in the art recognize that some aspects of the specific embodiments are equivalently implemented in an integrated circuit in whole or in part in the form of one or more computer programs executed on one or more computers (for example, one or more programs executed on one or more computer systems), one or more programs executed on one or more processors (for example, one or more programs executed on one or more microprocessors), firmware or nearly any combination thereof. Furthermore, designing the circuit and/or programing the software and/or firmware must be deemed well-known to persons skilled in the art in view of the present disclosure. Furthermore, persons skilled in the art understand that the mechanisms of the subject matter described herein can be distributed as program products in different ways, and that the illustrative specific embodiments of the subject matter described herein are applicable regardless of the specific types of the signal carrying medium for use in carrying out the distribution. Examples of the signal carrying medium include, but are not limited to: a recordable medium, such as a floppy disk, hard disk, compact disk (CD), digital versatile disk (DVD), digital tape, and computer memory; and a transmission medium, such as digital and/or analog communication medium (such as fiber-optic cable, waveguide, wired communicative connection, and wireless communicative connection).

The dental implantation system and method of the present disclosure are described above and depicted by the accompanying drawings. However, specific embodiments of the present disclosure merely serve illustrative purposes. Hence, various changes can be made to the specific embodiments of the present disclosure without departing from the claims and spirit of the present disclosure, and the changes shall be interpreted in a manner to fall within the scope of the claims of the present disclosure. Therefore, the specific embodiments are not restrictive of the present disclosure, whereas the scope and spirit of the present disclosure are defined in the appended claims.

What is claimed is:

1. A dental implantation system, comprising:
   a multi-axis robotic arm having an action end connected to a dental implantation device;
   at least one optical device coupled to the multi-axis robotic arm to capture a real-time image information about an implant-receiving region of an implant-receiving patient during a dental implantation process; and
a sensor disposed on the dental implantation device to detect a sensed measurement;
wherein the multi-axis robotic arm drives the dental implantation device moving along a predetermined path in the implant-receiving region according to an association result of a pre-implantation plan and the real-time image information,
wherein the pre-implantation plan is associated with a 3D model of the implant-receiving region and comprises a predetermined entry point associated with the predetermined path, at least one predetermined relay point associated with the predetermined path, and a predetermined target point associated with the predetermined path, wherein the 3D model is constructed from a pre-implantation image information about the implant-receiving region;
wherein the dental implantation device is driven to move along the predetermined path in the implant-receiving region and retreat from the predetermined path both upon arrival at the at least one predetermined relay point and when the sensed measurement exceeds a threshold;
wherein when the sensed measurement exceeds the threshold, the multi-axis robotic arm drives the dental implantation device to retreat from the dental implantation path and thereby return to the predetermined entry point position and computes a drilling unit displacement and updates the predetermined relay point anew.

2. The dental implantation system of claim 1, wherein the pre-implantation image information includes at least one of a computed tomography (CT) scan image information, a magnetic resonance imaging (MRI) image information, and an X-ray imaging image information.

3. The dental implantation system of claim 1, wherein the at least one optical device includes a first optical device and a second optical device, the first optical device being coupled to the action end of the multi-axis robotic arm to capture the real-time image information, and the second optical device being coupled to the multi-axis robotic arm to capture a mark position information.

4. The dental implantation system of claim 3, wherein the multi-axis robotic arm has a basal end different from the action end, and the second optical device is coupled to the basal end.

5. The dental implantation system of claim 3, further comprising a marking device rigidly connected to the implant-receiving patient, wherein the second optical device captures the mark position information associated with the marking device.

6. The dental implantation system of claim 1, wherein the predetermined path is determined according to at least one of an alveolar nerve position and a sinus position which are marked in the pre-implantation image information.

7. The dental implantation system of claim 1, wherein the at least one predetermined relay point is determined according to at least one of a bone density in the implant-receiving region and a length of the predetermined path.

8. The dental implantation system of claim 1, wherein the sensor is a temperature sensor or a pressure sensor disposed on the dental implantation device.

9. The dental implantation system of claim 1, further comprising an implant securing device driven by the multi-axis robotic arm to secure an implant in the implant-receiving region according to the predetermined path, wherein the implant securing device stop operating as soon as a real-time torque value associated with the implant reaches a predetermined torque threshold.

10. The dental implantation system of claim 1, further comprising an alert device coupled to the dental implantation device and adapted to send an alert information whenever the implant deviates from the predetermined path.

11. The dental implantation system of claim 10, further comprising a wearable display device in communicative connection with the processing device to display to an operator at least one of the real-time image information, the pre-implantation image information, the predetermined path, the predetermined entry point, the at least one predetermined relay point, the predetermined target point, a bone density in the implant-receiving region, a real-time temperature of the dental implantation device, a movement speed of the dental implantation device, a real-time torque of the implant, and a virtual image associated with the dental implantation process.

12. The dental implantation system of claim 1, further comprising a processing device in communicative connection with the multi-axis robotic arm and the at least one optical device to instruct the multi-axis robotic arm to drive the dental implantation device moving along the predetermined path in the implant-receiving region according to the association result of the pre-implantation plan and the real-time image information.

13. A dental implantation system, comprising:
a multi-axis robotic arm;
a dental implantation device connected to an action end of the multi-axis robotic arm; and
a sensor disposed on the dental implantation device to detect a sensed measurement;
wherein the multi-axis robotic arm drives the dental implantation device undergoing a reciprocating motion along a predetermined path in an implant-receiving region of an implant-receiving patient according to a pre-implantation plan until dental implantation drilling is complete,
wherein the pre-implantation plan comprises at least one predetermined relay point associated with the predetermined path and determined according to at least one of a bone density in the implant-receiving region and a length of the predetermined path;
wherein the dental implantation device is driven to move along the predetermined path in the implant-receiving region and retreat from the predetermined path both upon arrival at the at least one predetermined relay point and when the sensed measurement exceeds a threshold;
wherein when the sensed measurement exceeds the threshold, the multi-axis robotic arm drives the dental implantation device to retreat from the dental implantation path and thereby return to the predetermined entry point position and computes a drilling unit displacement and updates the predetermined relay point anew.

14. The dental implantation system of claim 13, further comprising:
a first optical device coupled to the action end of the multi-axis robotic arm to capture a real-time image information about the implant-receiving region while the dental implantation device is operating;
a marking device rigidly connected to the implant-receiving patient; and a second optical device coupled to a basal end of the multi-axis robotic arm to capture a mark position information of the marking device.

15. The dental implantation system of claim 14, further comprising a processing device in communicative connection with the multi-axis robotic arm, the first optical device and the second optical device to instruct the multi-axis robotic arm to drive the dental implantation device undergoing a reciprocating motion along the predetermined path in the implant-receiving region according to the association result of the pre-implantation plan and the real-time image information.

16. The dental implantation system of claim 15, further comprising a wearable display device in communicative connection with the dental implantation system to display to the operator at least one of the real-time image information, association information in the pre-implantation plan, the predetermined path, a bone density in the implant-receiving region, a real-time temperature of the dental implantation device, a movement speed of the dental implantation device, and a virtual image associated with a dental implantation drilling process.

17. The dental implantation system of claim 13, wherein the pre-implantation plan is associated with a 3D model of the implant-receiving region, and the 3D model is constructed from a pre-implantation image information about the implant-receiving region.

18. The dental implantation system of claim 17, wherein the predetermined path is determined according to at least one of an alveolar nerve position and a sinus position which are marked in the pre-implantation image information.

19. The dental implantation system of claim 13, wherein the pre-implantation image information includes at least one of a computed tomography (CT) scan image information, a magnetic resonance imaging (MRI) image information and an X-ray imaging image information.

20. The dental implantation system of claim 13, wherein the sensor is a temperature sensor or a pressure sensor disposed on the dental implantation device.

21. The dental implantation system of claim 13, wherein the dental implantation device is a retractable drilling device.

22. A dental implantation navigation method, for guiding movement of a dental implantation device along a predetermined path in an implant-receiving region in a dental implantation system, the method comprising:
obtaining, by the dental implantation system, a pre-implantation image information about the implant-receiving region;
constructing, by the dental implantation system, a 3D model of the implant-receiving region from the pre-implantation image information;
creating, by the dental implantation system, a pre-implantation plan according to the pre-implantation image information and the 3D model, wherein the pre-implantation plan comprises a predetermined entry point associated with the predetermined path, at least one predetermined relay point associated with the predetermined path, and a predetermined target point associated with the predetermined path;
obtaining, by the dental implantation system, a real-time image information about the implant-receiving region;
generating, by the dental implantation system, a position transformation information according to at least one initial feature point included in the pre-implantation image information and at least one first feature point included in the real-time image information, so as to align a first position displayed in the real-time image information with a second position displayed in the pre-implantation image information; and
driving, by the dental implantation system, the dental implantation device to undergo a reciprocating motion along the predetermined path in the implant-receiving region according to the pre-implantation image information, the real-time image information, the position transformation information, and the pre-implantation plan,
detecting, by a sensor disposed on the dental implantation device to detect a sensed measurement;
wherein the dental implantation system drives the dental implantation device to retreat from the predetermined path both when the dental implantation device moves to the at least one predetermined relay point or the predetermined target point according to the pre-implantation plan and when the sensed measurement exceeds a threshold;
wherein when the sensed measurement exceeds the threshold, the dental implantation device retreat from the dental implantation path and thereby return to the predetermined entry point position and computes a drilling unit displacement and updates the predetermined relay point anew.

23. The method of claim 22, further comprising:
detecting, by the sensor, a real-time temperature value or a real-time pressure value of the dental implantation device.

24. The method of claim 22, further comprising:
obtaining, by the dental implantation system, a mark position information of a marking device, wherein the marking device is rigidly connected to the implant-receiving region;
comparing, by the dental implantation system, the mark position information and a determined movement threshold to determine whether a current position of the implant-receiving region has changed; and
adjusting, by the dental implantation system upon affirmative determination, the current position of the dental implantation device according to the mark position information and the change in the current position of the implant-receiving region.

25. The method of claim 22, further comprising aligning the position of an action end of the dental implantation device.

26. The method of claim 22, further comprising determining the at least one predetermined relay point according to a bone density in the implant-receiving region and a length of the predetermined path.

27. The method of claim 22, wherein the step of obtaining a pre-implantation image information about the implant-receiving region includes marking at least one of an alveolar nerve position in the implant-receiving region and a sinus position in the pre-implantation image information.

28. The method of claim 22, further comprising providing, by a wearable display device, to the operator at least one of the real-time image information, association information in the pre-implantation plan, the predetermined path, a bone density in the implant-receiving region, a real-time temperature of the dental implantation device, a movement speed of the dental implantation device, and a virtual image associated with a dental implantation process.

* * * * *